United States Patent
Yang et al.

(10) Patent No.: US 9,413,873 B2
(45) Date of Patent: Aug. 9, 2016

(54) MOBILE TERMINAL AND CONTROLLING METHOD THEREOF

(71) Applicant: LG ELECTRONICS INC., Seoul (KR)

(72) Inventors: Hyejeong Yang, Seoul (KR); Jeonghoon Yi, Seoul (KR); Sungkyu Chie, Seoul (KR); Il Won, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/095,895

(22) Filed: Dec. 3, 2013

(65) Prior Publication Data
US 2014/0155111 A1    Jun. 5, 2014

(30) Foreign Application Priority Data
Dec. 4, 2012 (KR) .......................... 10-2012-0139834

(51) Int. Cl.
| | | |
|---|---|---|
| *H04M 1/725* | (2006.01) | |
| *G06F 3/0486* | (2013.01) | |
| *G06F 3/0488* | (2013.01) | |
| *G06F 3/0484* | (2013.01) | |
| *H04L 12/58* | (2006.01) | |

(52) U.S. Cl.
CPC ......... *H04M 1/72552* (2013.01); *G06F 3/0486* (2013.01); *G06F 3/04842* (2013.01); *G06F 3/04883* (2013.01); *H04L 51/38* (2013.01)

(58) Field of Classification Search
CPC .... H04M 1/72552; H04W 4/12; H04L 51/38; G06F 3/04842; G06F 3/0486; G06F 3/04883
USPC ....................................................... 455/466
See application file for complete search history.

(56) References Cited

U.S. PATENT DOCUMENTS

| | | | | |
|---|---|---|---|---|
| 2006/0026521 | A1* | 2/2006 | Hotelling | G06F 3/0418 715/702 |
| 2007/0247435 | A1* | 10/2007 | Benko | G06F 3/0488 345/173 |
| 2008/0263159 | A1* | 10/2008 | Choi | H04L 12/585 709/206 |
| 2008/0271119 | A1* | 10/2008 | Manne et al. | 726/3 |
| 2010/0011317 | A1* | 1/2010 | Lee | 715/784 |
| 2011/0076994 | A1* | 3/2011 | Kim et al. | 455/414.2 |
| 2013/0035054 | A1* | 2/2013 | Ashton | H04M 1/576 455/404.1 |
| 2013/0335333 | A1* | 12/2013 | Kukulski | G06F 3/04845 345/173 |
| 2014/0006970 | A1* | 1/2014 | Casey et al. | 715/753 |

OTHER PUBLICATIONS

"Ask Dave Taylor" (http://www.askdavetaylor.com/save_the_number_of_a_text_message_sender_on_my_iphone/).*

* cited by examiner

*Primary Examiner* — Nathan Taylor
(74) *Attorney, Agent, or Firm* — Birch, Stewart, Kolasch & Birch, LLP

(57) ABSTRACT

A mobile terminal including a memory configured to store data; a wireless communication unit configured to perform wireless communication with a counterpart terminal; a display unit configured to display messages communicated with a counterpart of the counterpart terminal; and a controller configured to receive a selection signal selecting a first message included in the displayed messages, extract data including at least one of counterpart contact information, time information and memo information from the selected first message in response to the received selection signal, and update or add information stored in the memory of the mobile terminal using the extracted data.

18 Claims, 19 Drawing Sheets

MOBILE TERMINAL AND CONTROLLING METHOD THEREOF

Pursuant to 35 U.S.C. §119(a), this application claims the benefit of earlier filing date and right of priority to Korean Application No. 10-2012-0139834, filed on Dec. 4, 2012, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for updating or adding counterpart information of a chat counterpart from a message with the chat counterpart.

2. Discussion of the Related Art

A mobile terminal can perform various functions such as data and voice communications, capturing images and video via a camera, recording audio, playing music files and outputting music via a speaker system, and displaying images and video on a display. Generally, terminals can be classified into mobile terminals and stationary terminals. Mobile terminals can be further classified into handheld terminals and vehicle mount terminals.

There are ongoing efforts to support and increase the functionality of mobile terminals. Such efforts include software and hardware improvements, as well as changes and improvements in the structural components which form the mobile terminal.

A mobile terminal has been traditionally used for performing a communication with a different terminal. Recently, the mobile terminal can communicate with other terminals through various paths including an instant message, an email and the like as well as a voice call and a text message.

A text message, an instant message, an email and the like allows the user to communicate with other users in different ways than the traditional phone call. The messages are also generally saved allowing the user to later view any particular message, email, etc. However, referring back to old messages if also inconvenient to the user.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which counterpart information of a chat counterpart can be updated or added based on a message with the chat counterpart.

Another object of the present invention is to provide a mobile terminal and controlling method thereof, by which counterpart information of a chat counterpart can be updated or added in a manner of automatically extracting prescribed data from a message with the chat counterpart.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a memory configured to store data, a wireless communication unit configured to perform wireless communications, a display unit configured to display messages with a counterpart, and a controller configured to attempt to extract data by targeting at least one message among the messages displayed through the display unit, and update or add a counterpart information of the counterpart based on the extracted data.

In another aspect of the present invention, a method of controlling a mobile terminal according to another embodiment of the present invention may include the steps of specifying at least one message among messages with a counterpart displayed through a display unit, attempting to extract data by targeting the specified message, and updating or adding counterpart information of the counterpart based on the extracted data.

Effects obtainable from the present invention may be non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIGS. 13(a) to 13(e) are diagrams to describe a memo application according to the present invention;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipment, smart phones, digital broadcast receivers, personal digital assistants, laptop computers, portable multimedia players (PMP), navigators and the like. However, the present invention is applicable to such a fixed terminal as a digital TV, a desktop computer and the like as well as a mobile terminal.

Figure 1:
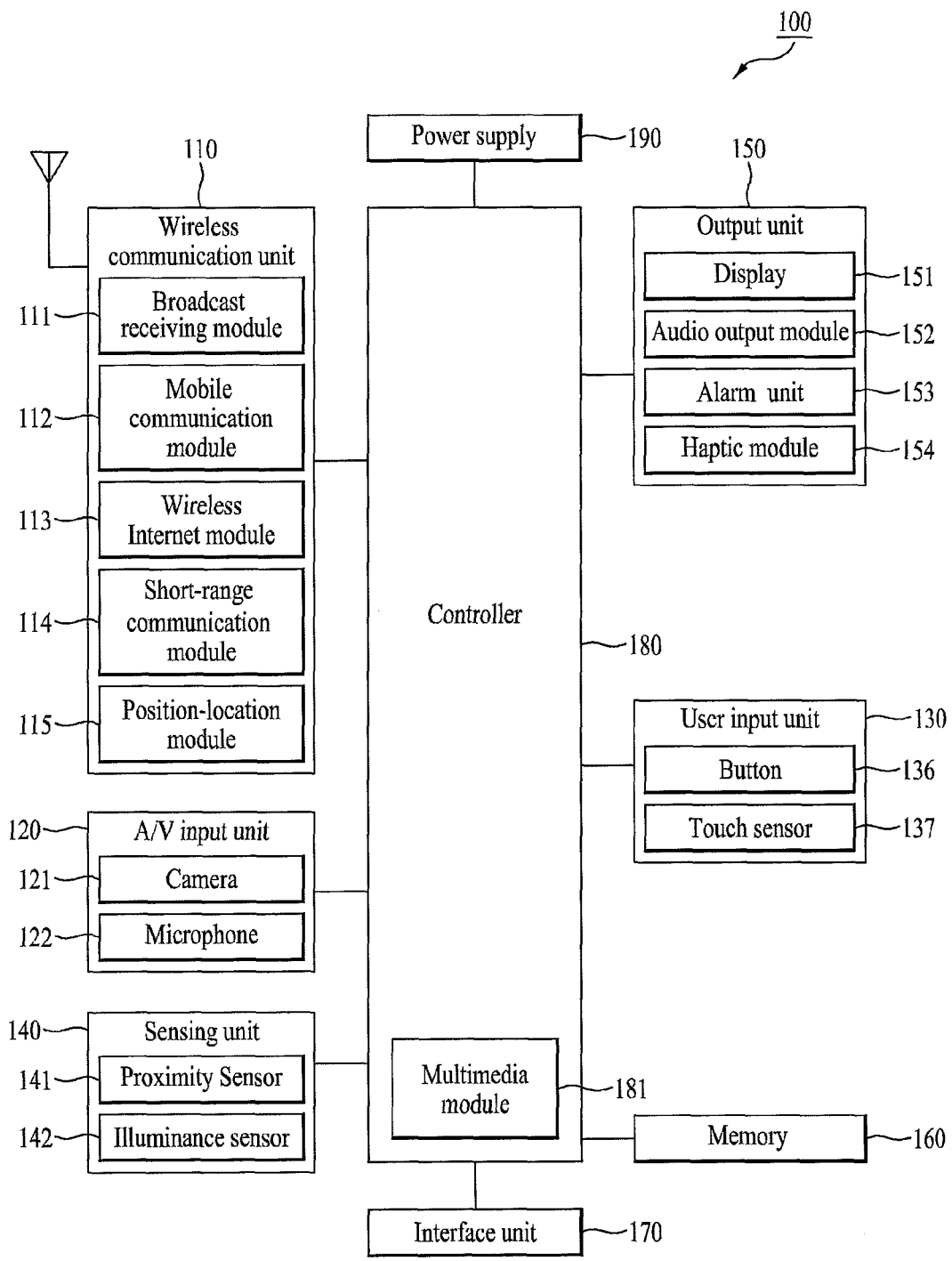
FIG. 1 is a block diagram of a mobile terminal according to one embodiment of the present invention.

FIG. 1 is a block diagram of a mobile terminal 100 in accordance with an embodiment of the present invention.

FIG. 1 shows the mobile terminal 100 includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

When the display 151 and the touch sensor 137 configures a mutual layer structure (hereinafter called 'touch screen'), it is able to use the display 151 as an input device as well as an output device. In this instance, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
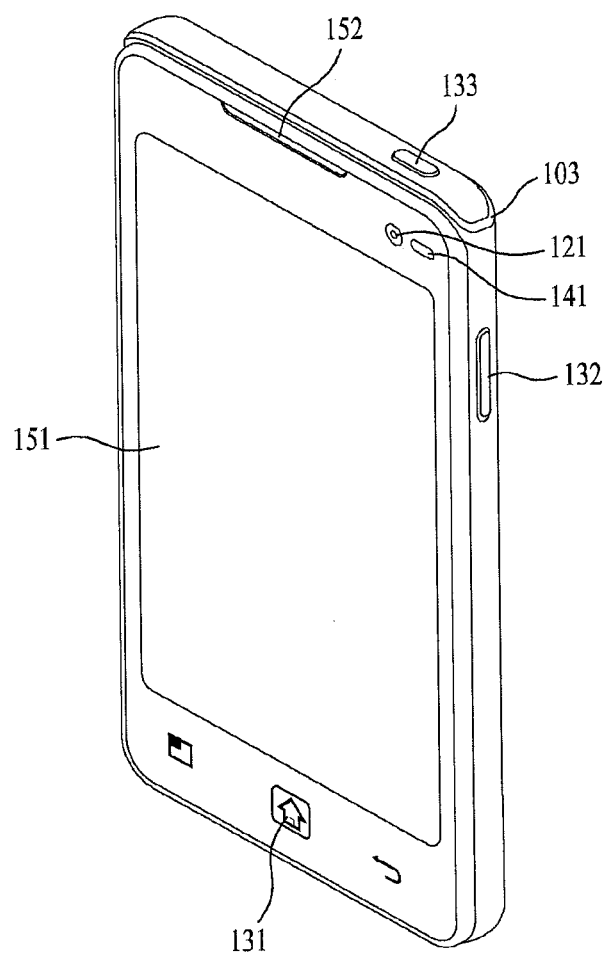
FIG. 2 is a front perspective diagram of a mobile terminal according to one embodiment of the present invention.

Referring to FIG. 2, the proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. Further, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 3:
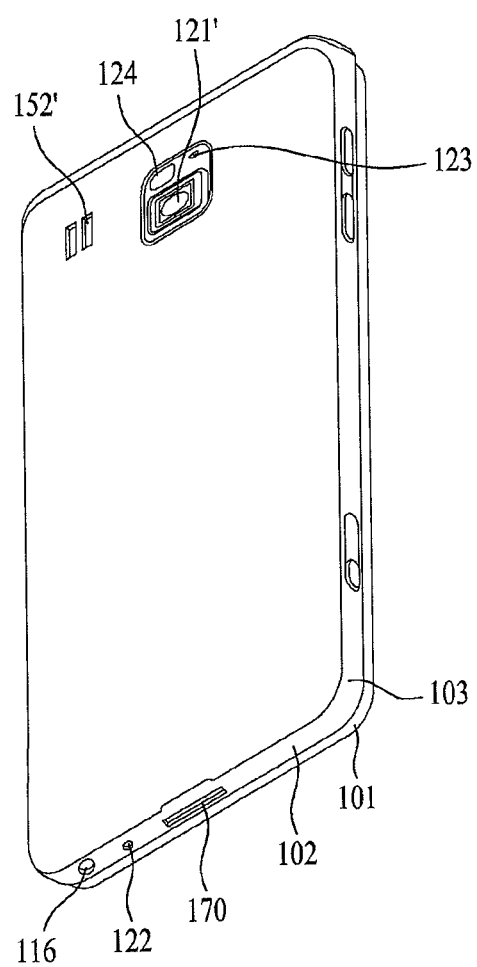
FIG. 3 is a rear perspective diagram of a mobile terminal according to one embodiment of the present invention.

Next, FIG. 2 is a front perspective diagram and FIG. 3 is a rear perspective view of a mobile terminal according to one embodiment of the present invention. The mobile terminal 100 shown in the drawing has a bar type terminal body, however the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIGS. 2 and 3, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

If the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. Further, the input unit 130 includes a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. Further, a command for a volume adjustment of sound output from the audio output unit 152 and the like can be input to the second manipulating unit 132, a command for a switching to a touch recognizing mode of the display 151 and the like can be input to the second manipulating unit 133.

Referring to FIG. 3, a camera 121' can be additionally provided to a backside of the terminal body, and more particularly, to the rear case 102. The camera 121' has a photographing direction that is substantially opposite to the camera 121 shown in FIG. 2 and may have pixels differing from those of the camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For clarity and convenience of the following description, assume that a mobile terminal 100 mentioned in the following description of the present invention includes at least one of the components shown in FIG. 1. In particular, assume that a mobile terminal 100 according to the present invention includes the memory 160 configured to store data, the wireless communication unit 110 configured to perform wireless communications, the display unit 151 configured to display a message with a chat counterpart, and the controller 180 configured to perform data extraction on at least one of messages displayed on the display unit 151, the controller 180 updating and/or adding counterpart information of a chat counterpart based on the extracted data.

Terminologies used in the description of the present invention can be defined as follows.

i) 'Message' mentioned in the description of the present invention may include at least one of a received message received from a chat counterpart and a transmitted message transmitted from a chat counterpart. Moreover, each of the received message and the transmitted message may be transceived with the chat counterpart in format of one of a text message (e.g., SMS, LMS, MMS, etc.), an instant message using a mobile messenger or RCS (rich communication suite), an email and the like.

ii) 'Counterpart' mentioned in the description of the present invention may mean a person (or a mobile terminal 100 of the person) transceiving a message with the mobile terminal 100. Alternatively, the 'counterpart' can be understood as one of a person (or a mobile terminal 100 of the person) whose contact data is recorded in a phonebook database, a person (or a mobile terminal 100 of the person) in a chat enabled state through a mobile messenger, RCS or the like and the like. 'Chat counterpart' may mean a person (or a mobile terminal 100 of the person) having a history of having a chat with the mobile terminal 100 according to the present invention using a message among 'counterparts' or a person (or a mobile terminal 100 of the person) currently having a chat with the mobile terminal 100 according to the present invention among 'counterparts'. Moreover, 'counterpart' may be conceptually understood as including 'chat counterpart' unless mentioned with special description. In addition, 'user' may mean a person intending to use the mobile terminal 100 according to the present invention or a person currently in use of the mobile terminal 100 according to the present invention.

iii) 'Counterpart information' mentioned in the description of the present invention may include at least one of a contact data of a chat counterpart, a schedule with a chat counterpart and a memo for a chat counterpart. The counterpart information can be saved in the memory 160. Among the counterpart information, 'contact data' is a record of a contact of a prescribed counterpart. In addition, the contact data may include a field value of at least one of a name, profile photo, phone number and email address of the prescribed counterpart. Contact data of at least one counterpart can be saved as 'phonebook database' in the memory 160. In addition, the controller 180 can extract the contact data of the prescribed counterpart from the phonebook database using the field value recorded in the contact data.

If the display unit 151 of the mobile terminal 100 according to the present invention includes a touchscreen, implementation of the following embodiments may be further facilitated. Therefore, the following description is made on the assumption that the display unit 151 includes the touchscreen. If the display unit 151 does not include the touchscreen, the mobile terminal 100 according to the present invention may further include a separate input device configured to receive a user input.

Figure 4:
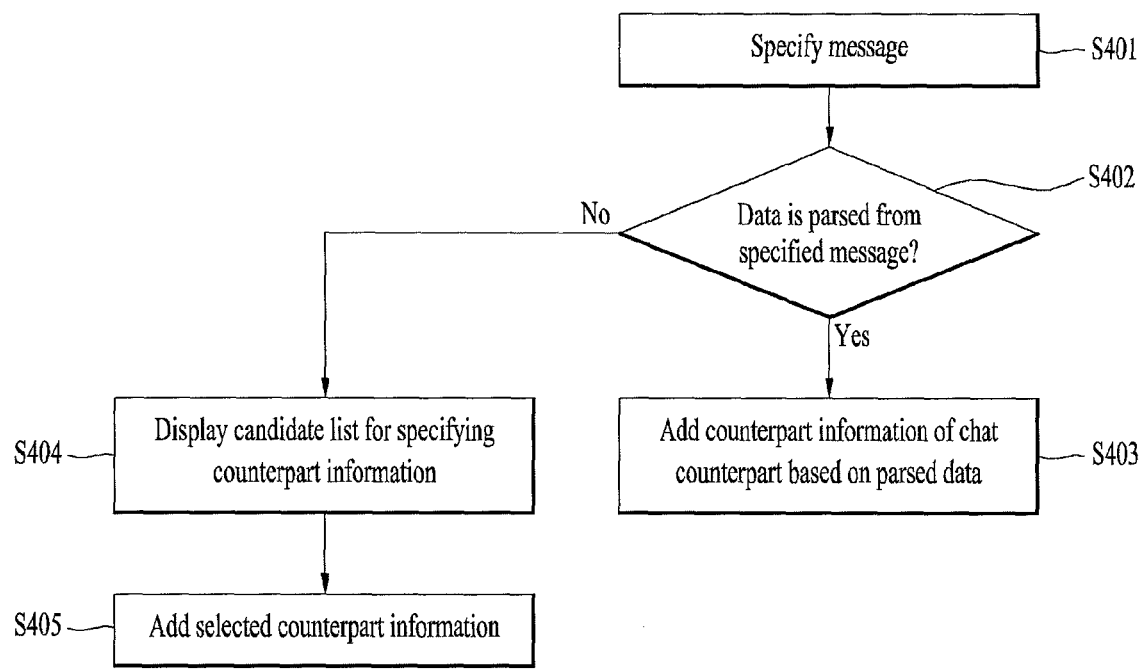
FIG. 4 is a flowchart illustrating an operation of a mobile terminal according to the present invention.

Next, FIG. 4 is a flowchart illustrating an operation of a mobile terminal according to an embodiment of the present invention. For clarity of the following description, a message, which becomes a target of data extraction among at least one or more messages displayed on the touchscreen, shall be named a 'first message'. The first message may indicate one of messages displayed on the touchscreen or at least two of the messages displayed on the touchscreen. For clarity of the following description, assume that the first message includes one of the messages displayed on the touchscreen.

Referring to FIG. 4, the controller 180 can specify at least one of messages displayed on the touchscreen as a first message (S401). In this instance, the selection of the first message can be performed by a first touch input. In particular, the first touch input may include an action of touching a first point within a display region of the first message or an action of touching a first point within a display region of the first message and a second point within a display region of a profile of a chat counterpart substantially at the same time or sequentially. In this instance, each of the 'touch' to the first point and the 'touch' to both of the first point and the second point may include at least one of a simple contact touch of simply touching the first point and/or the second point with a pointer, a long touch of touching the first point or the second point with a pointer for prescribed duration, a proximity touch to the first point or the second point, a drag to the second point from the first point, and a drag to the first point from the second point.

Moreover, the display region of the profile of the chat counterpart may include at least one of a display region of a profile photo set up by the chat counterpart, a display region of a nickname set up by the chat counterpart, a display region of a name of the chat counterpart, and a display region of a phone number of the chat counterpart.

Detailed examples of the first touch input are described with reference to FIGS. 5 and 6 as follows. In particular, FIG. 5 shows one example that a first message is selected by touching a first point 501 within a display region of a prescribed message, and FIG. 6 shows one example that a first message is selected by a touch to a first point 601 within a display region of a prescribed message and a second point 602 within a display region of a profile of a chat counterpart.

Figure 5:
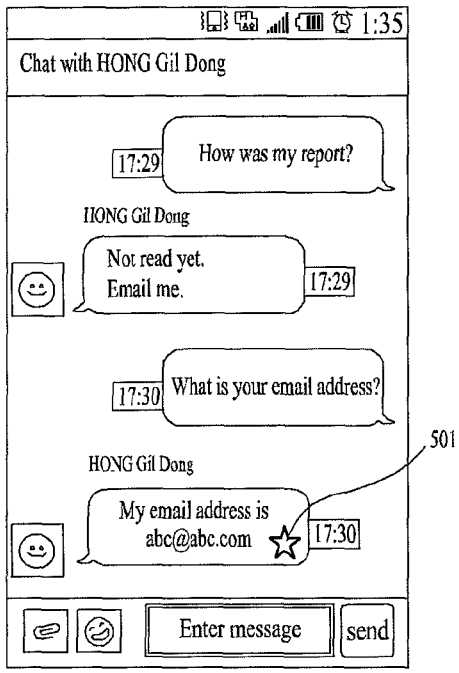
FIGS. 5(a) to 5(d) are diagrams illustrating one example to describe a first touch input.
Figure 5:
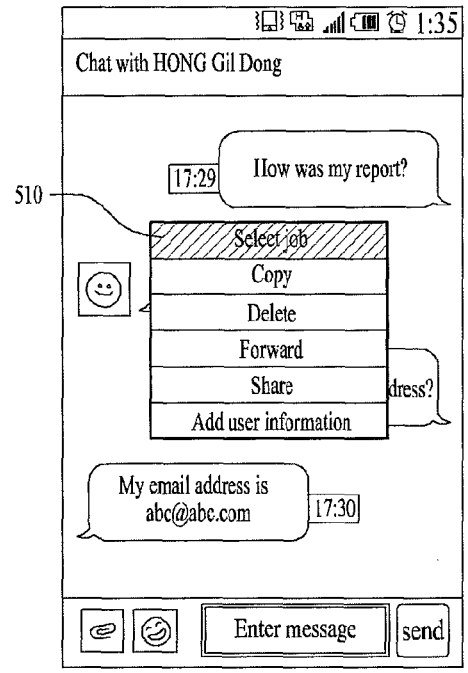
Figure 5:
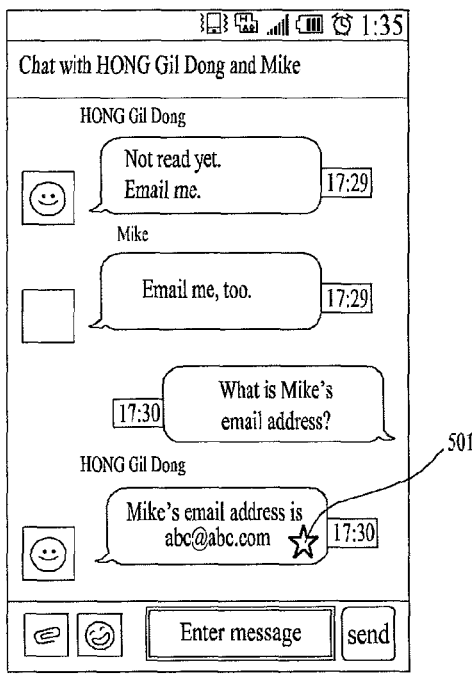
Figure 5:
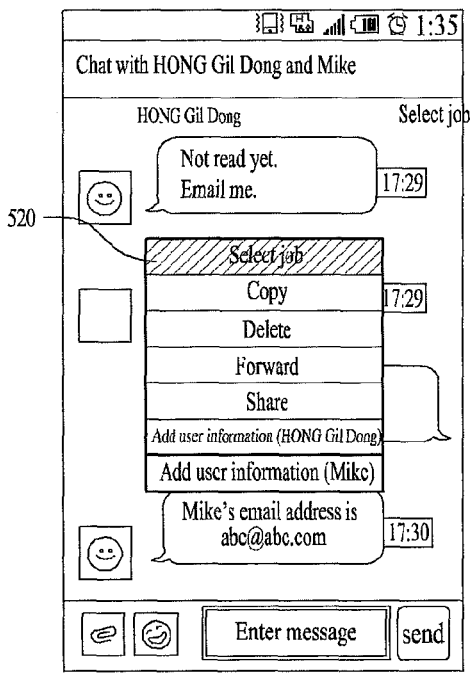
Figure 6:
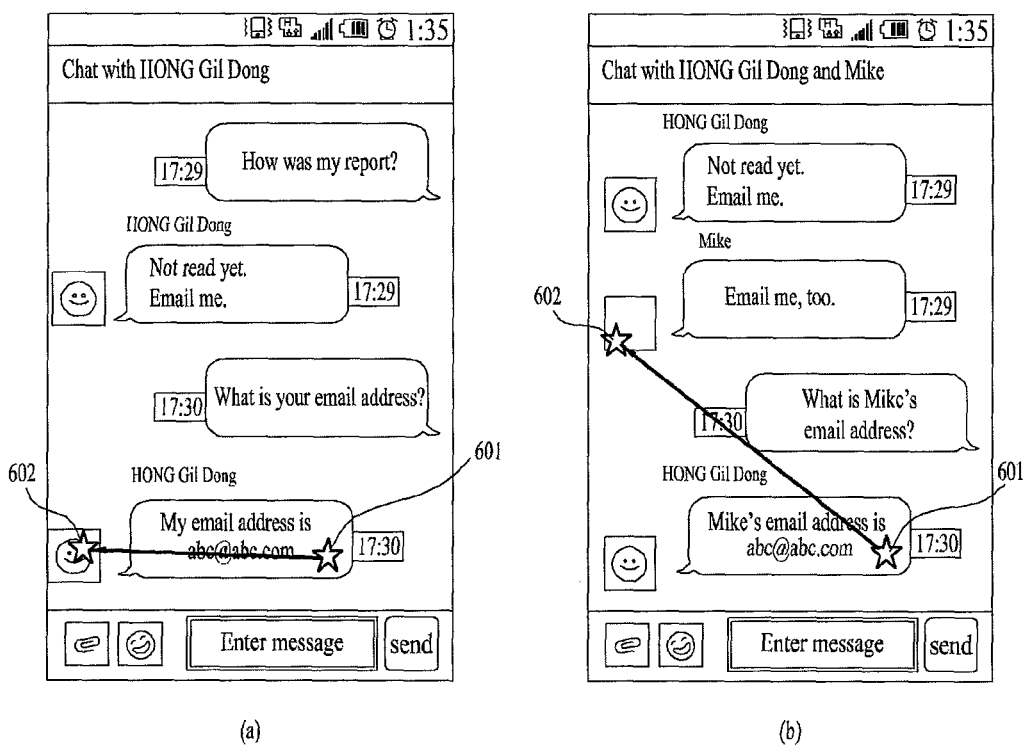
FIG. 6(a) and FIG. 6(b) are diagrams illustrating another example to describe a first touch input.

First, referring to FIG. 5, if a first point 501 within a display region of a prescribed message among a plurality of messages output through the touchscreen is touched (FIG. 5(a)), the controller 180 determines the prescribed message indicated by the first point 501 as a first message and then displays a popup window 510, which is provided to determine an operation intended to be performed based on the first message, to be displayed (FIG. 5(b)).

If it is set to perform a data extraction on the first message through the popup window 510, the controller 180 can attempt data extraction from the first message. For instance, an item 'Add counterpart/user information' in the popup window 510 shown in FIG. 5(b) may be provided to perform an operation of attempting the data extraction from the first message and then adding the extracted data as counterpart information of a chat counterpart. In the example shown in FIG. 5(b), if the item 'Add counterpart/user information' is touched, the controller 180 can attempt the data extraction by targeting the first message.

If messages are transceived with a plurality of chat counterparts, referring to FIG. 5(c), the controller 180 can control a portion of the popup window 510 shown in FIG. 5(b) or a popup window, which is provided to select a chat counterpart from a plurality of the chat counterparts to add the extracted data as personal information, to be additionally displayed. In FIG. 5(d), an item 'Add counterpart/user information' is displayed for each user on a popup window 520. If a first message is specified when performing a group chat with at least two counterparts, the controller 180 can add data extracted from the first message as counterpart information of at least one chat counterpart selected through the popup window 520 shown in FIG. 5(d).

Unlike FIG. 5, FIG. 6 shows one example that a first message is selected by a touch to a first point within a display region of a prescribed message and a second point within a display region of a profile of a chat counterpart. In FIG. 6, assume that the display region of the profile of the chat counterpart includes a region on which a profile photo set up by the chat counterpart is displayed.

Referring to FIG. 6(a), if a first point 601 within a display region of a prescribed message and a second point 602 within a display region of a profile of a chat counterpart are touched (e.g., a drag from the first point 601 to the second point 602 is shown in FIG. 6(a)), the controller 180 determines a prescribed message indicated by the first point 601 as a first message and can then attempt a data extraction by targeting the first message. In this instance, data extracted from the first message may be used to add counterpart information of a chat counterpart (e.g., HONG Gil Dong in FIG. 6 (a)) indicated by the second point 602.

FIG. 6 illustrates specify a chat counterpart, to which counterpart information will be added, through the touch to the second point 602. Hence, even if a group chat with a plurality of counterparts is attempted, a popup window does not have to be displayed to guide a selection of a prescribed counterpart from a plurality of chat counterparts unlike FIG. 5.

For instance, referring to FIG. 6(b), while contents of a chat with a plurality of chat counterparts are displayed, if a first point 601 within a display region of a message (e.g., the message received from HONG Gil Dong in FIG. 6(b)) with a prescribed chat counterpart and a second point 602 within a display region (e.g., a region on which Mike's photo is displayed in FIG. 6(b)) of a profile display region of another chat counterpart are touched (e.g., a drag from the first point 601 to the second point 602 in FIG. 6(b)), the controller 180 can add the data, which is extracted from the first message with the prescribed chat counterpart, as counterpart information of another chat counterpart.

In particular, in the examples shown in FIGS. 6(a) and 6(b), the touch to the first point 601 may be provided to determine the first message among the messages displayed on the touchscreen and the touch to the second point 602 may be provided to specify the chat counterpart to which counterpart information will be added.

Although FIG. 6 shows one example that the first touch input includes the drag input to the second point 602 from the first point 601, as mentioned in the foregoing description, the first touch input may include one of a drag to the first point 601 from the second point 602, a sequential touch to the first point 601 and the second point 602, and a substantially simultaneous touch to the first point 601 and the second point 602 using two pointers.

Referring again to FIG. 4, after the first message has been specified, the controller 180 attempts data extraction by targeting the first message (S402, S403) and can then update or add counterpart information of a chat counterpart based on the data extracted as a result of the data extraction (S404).

The controller can attempt an extraction of at least one of a personal information data, a time information data and a memo related keyword by targeting the first message. If the personal information data is extracted from the first message, the controller 180 can update or add a contact data of the chat counterpart based on the extracted personal information data. If the time information data is extracted from the first message, the controller 180 can add a schedule with the chat counterpart to the day and time indicated by the extracted time information data.

Moreover, if the memo related keyword is extracted from the first message, the controller 180 can control at least one portion of the first message to be saved as a memo for the chat counterpart. Operations of the mobile terminal 100 shall be described in detail as follows, by discriminating extracting personal information data from a first message, extracting time information data from a first message, and extracting a memo related keyword from a first message from each other.

<Extraction of Personal Information Data>

If personal information data is extracted from a first message, the controller 180 can update or add contact data of a chat counterpart based on the extracted personal information data. In particular, the controller 180 inserts the extracted personal information data in at least one field value of the contact data of the chat counterpart based on the extracted personal information data, thereby updating the contact data of the chat counterpart or newly creating chat counterpart's contact data having the extracted personal information data as a field value. In this instance, the extracted personal information data may include at least one of a profile image, phone number and email address of the chat counterpart.

A process for updating or adding the contact data of the chat counterpart based on the extracted personal information data is described in detail with reference to FIGS. 7 and 8 as follows.

Figure 7:
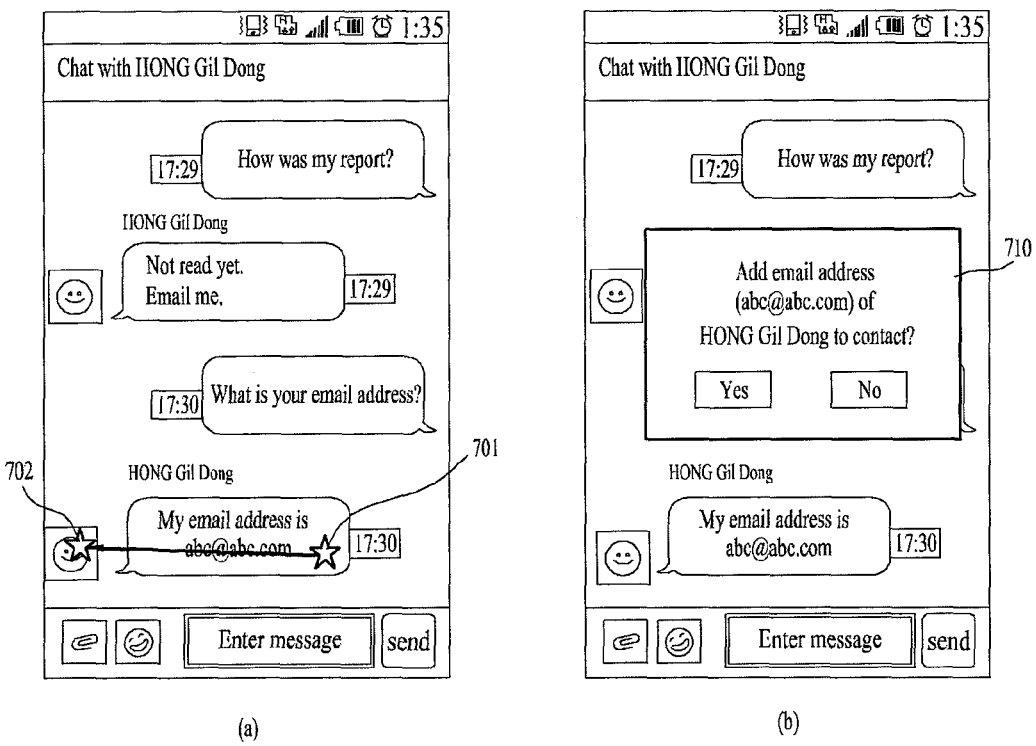
FIGS. 7(a) to 7(c) are diagrams illustrating one example to describe a process for updating contact data of a chat counterpart based on extracted personal information data.
Figure 7:
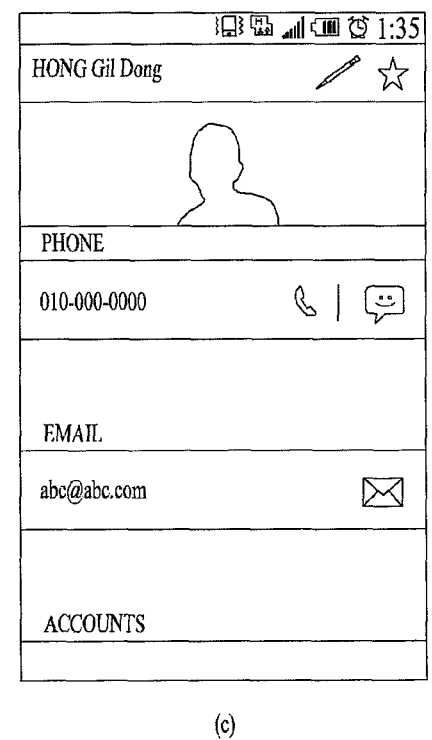

FIG. 7 is a diagram illustrating one example to describe a process for updating contact data of a chat counterpart based on extracted personal information data. For clarity of the following description, assume that an extracted personal information data shown in FIG. 7 includes an email address of a chat counterpart. In addition, assume that a first touch input for specifying a first message is performed by a touch to a first point 701 within a display region of a prescribed message and a second point 702 within a display region of a profile of a chat counterpart, as shown in FIG. 6.

Referring to FIG. 7(a), if a touch to a first point 701 within a display region of a prescribed message and a second point 702 within a display region of a profile of a chat counterpart is input, the controller 180 can attempt extraction of personal information data from a first message. In particular, the controller 180 can extract at least one of a text string of an email format, a text string of a phone number format, a text string of an address format and a multimedia file of an image format as a personal information data.

In this instance, the text string of the email format may be provided to extract data assumed as an email address of the chat counterpart and the text string of the phone number format may be provided to extract data assumed as a phone number of the chat counterpart. Moreover, the multimedia file of the image format may be provided to extract data assumed as a profile image of the chat counterpart.

In the example shown in FIG. 7(a), since a text string 'abc@abc.com' of the email format is included in the first message specified by the first touch input, the controller 180 can extract the text string 'abc@abc.com' from the first message. For instance, if a text '@' for discriminating an internet user ID from a domain address is included in the first message, as shown in FIG. 7(a), the controller 180 can extract a text string located before the @ and a text string located after the @ as an email address of the chat counterpart.

In another instance, if numerals equal to greater than N digits (where, N is a natural number greater than 4) are consecutively displayed on the first message or N or more numerals discriminated from each other by blanks, hyphens '-', closing parentheses ')' or ')' and the like are displayed on the first message, the controller 180 can extract the numerals displayed on the message as a phone number of the chat counterpart. In another instance, if a multimedia file (e.g., a file having such an extension as jpg, tiff, bmp, png, gif and the like) of an image format is attached to the first message, the controller 180 can extract the multimedia file of the image format as a profile image of the chat counterpart. In doing so, the controller 180 can extract the attached image file as the profile image of the chat counterpart by applying face recognition algorithm only if a human face is included in the multimedia file of the image format.

The above-mentioned extraction schemes are provided to describe one example of the present invention only. In addition, the personal information data extracting method according to the present invention may not need to follow the above-enumerated roles.

Once the personal information data is extracted from the first message, the controller 180 can insert the extracted personal information data in at least one field value of the contact data of the chat counterpart. Prior to this, referring to FIG. 7(b), the controller 180 can control a popup window 710, which is provided to query whether to insert the extracted personal information data in the field value of the contact data of the chat counterpart, to be displayed on the touchscreen. Subsequently, the controller 180 can determine whether to insert the extracted personal information data in the field value of the contact data of the chat counterpart based on a user input to the popup window 710 shown in FIG. 7(b). However, displaying the popup window 710 shown in FIG. 7(b) is an optional step only.

If the personal information data is extracted from the first message, the controller 180 can insert the extracted personal information data in the field value of the contact data of the chat counterpart. For instance, if the text string 'abc@abc.com' shown in FIG. 7(a) is extracted as an email address of the chat counterpart, referring to FIG. 7(c), the controller 180 can control the extracted email address value to be automatically inserted in an email address field value of the contact data of the chat counterpart.

In another instance, if a data assumed as a phone number of the chat counterpart is extracted from the first message, the extracted personal information data may be inserted in a phone number field value of the contact data of the chat counterpart. In another instance, if a data assumed as a profile image of the chat counterpart is extracted from the first message, the extracted personal information data may be inserted in a profile image field value of the contact data of the chat counterpart.

If a previously saved data exists in a field value in which the extracted personal information data will be inserted, the controller 180 deletes the previously saved data and then inserts the extracted personal information data in the corresponding field value. Alternatively, the controller 180 preserves the previously saved data and also inserts the extracted personal information data in a new field value.

For instance, although the email address 'abc@abc.com' has been extracted from the first message shown in FIG. 7(a), if the data 'abc@abc.com' is already inserted in the email address field value of the contact data of the chat counterpart, the controller 180 deletes the field value 'abc@abc.com' and then inserts 'abc@abc.com' as the email address value. Alternatively, the controller 180 preserves the data of the email address field value 'abc@abc.com' and can insert 'abc@abc.com' as a separate email address field value. In the former case, one email address will be saved in the contact data of the chat counterpart. In the latter case, two email addresses will be saved in the contact data of the chat counterpart. This scheme shall be identically applicable to such a field value as a phone number, a profile image and the like as well as to the email address.

If a plurality of personal information data are extracted from the first message, the controller 180 can add all of a plurality of the extracted personal information data to field values of the contact data of the chat counterpart. For instance, if an email address and a phone number are extracted from the first message, the controller 180 can control the extracted data to be inserted in an email address field value and a phone number field value of the contact data of the chat counterpart.

Like the example shown in FIG. 7, if it is intended to update the contact data of the chat counterpart using the extracted personal information data, the contact data of the chat counterpart should be already saved in the memory 160. In particular, the embodiment shown FIG. 7 is applicable to extracting a contact data of a chat counterpart from a phonebook database.

On the contrary, if the contact data of the chat counterpart does not exist in the phonebook database or it is unable to extract the contact data of the chat counterpart from the phonebook database, the controller 180 may newly create a contact data of the chat counterpart based on the extracted personal information data. This is described in detail with reference to FIG. 8 as follows.

Figure 8:
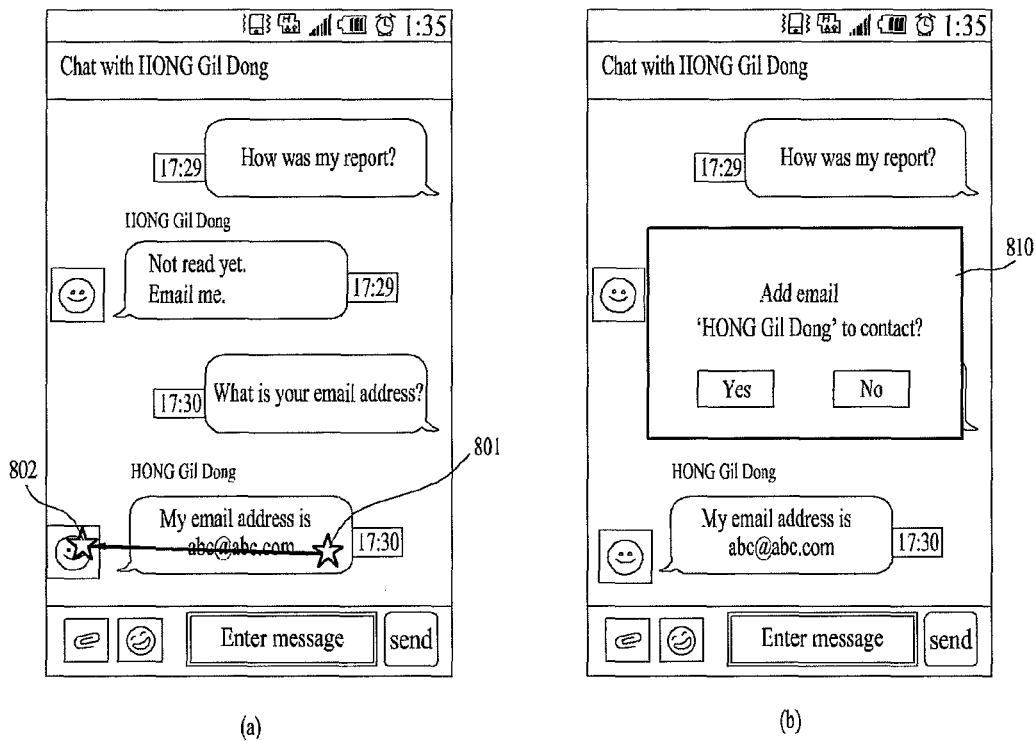
FIGS. 8(a) to 8(c) are diagrams illustrating one example to describe a process for adding contact data of a chat counterpart based on extracted personal information data.
Figure 8:

FIG. 8 is a diagram illustrating one example to describe a process for adding contact data of a chat counterpart based on extracted personal information data. Referring to FIG. 8(a), if a touch to a first point 801 within a display region of a prescribed message and a second point 802 within a display region of a profile of a chat counterpart is input, the controller 180 can attempt extraction of personal information data from a first message.

If the personal information data is extracted from the first message, the controller 180 may attempt to extract contact data of the chat counterpart from a phonebook database. In doing so, the controller 180 can attempt the extraction of the contact data of the chat counterpart using at least one of a nickname, phone number and profile image of the chat counterpart.

If it is unable to extract the contact data of the chat counterpart from the phonebook database, the controller 180 can newly create contact data of the chat counterpart based on the extracted personal information data. Prior to this, referring to FIG. 8(b), the controller 180 can control a popup window 810, which is provided to query whether to add the contact data of the chat counterpart, to be displayed on the touchscreen. Subsequently, the controller 180 can determine whether to add the contact data of the chat counterpart based on a user input to the popup window 810 shown in FIG. 8(b). However, displaying the popup window 810 shown in FIG. 8(b) is an optional step only.

If a contact data of the chat counterpart is newly created, the controller 180 can control the extracted personal information data to be automatically input to at least one field value of the contact data. For instance, referring to FIG. 8(c), the controller 180 may control 'abc@abc.com', which is assumed as an email address of the chat counterpart, to be automatically input to an email address field value. Moreover, the controller 180 can control at least one of a nickname and phone number of the chat counterpart to be automatically input to a chat counterpart's name field value and a chat counterpart's phone number field of the contact data, respectively.

For instance, if a message received from the chat counterpart is an instant message, a nickname of the chat counterpart can be automatically input to a name field value. Of a message received from the chat counterpart is a text message, a phone number of the chat counterpart can be automatically input to a phone number field value. Because a nickname of the chat counterpart is 'HONG Gil Dong' in FIG. 8(a), referring to FIG. 8(c), 'HONG Gil Dong' can be automatically input as the name field value of the contact data. In addition, other field values, which cannot be input automatically, may be manually input by a user.

Like the examples shown in FIG. 7 and FIG. 8, when a personal information data is extracted from a first message, the controller 180 can update or add contact data of a chat counterpart based on the extracted personal information data. When the mobile terminal 100 transceives messages with a plurality of chat counterparts, the controller 180 can update or add contact data of a chat counterpart using the message with another chat counterpart. For instance, if a plurality of the chat counterparts currently having a chat with the mobile terminal 100 are defined as a first chat counterpart and a second chat counterpart, the controller 180 can update or add contact data of the second chat counterpart using the personal information data extracted from the message with the first chat counterpart. This is described in detail with reference to FIG. 9 as follows.

Figure 9:
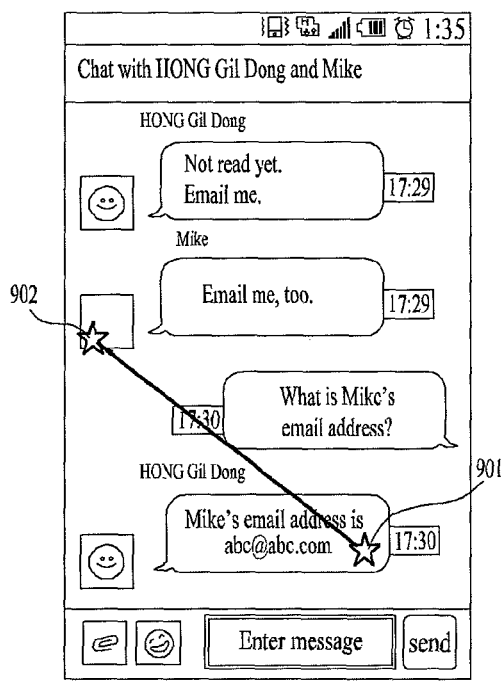
FIGS. 9(a) and 9(b) are diagrams illustrating one example to describe a process for updating contact data of a second chat counterpart based on personal information data extracted from a message with a first chat counterpart.
Figure 9:
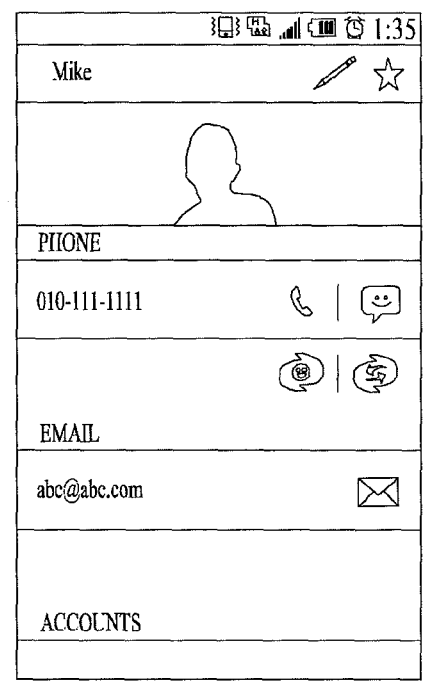

FIG. 9 is a diagram illustrating one example to describe a process for updating contact data of a second chat counterpart based on personal information data extracted from a message with a first chat counterpart. For clarity of the following description, assume that a personal information data extracted from a first message is an email address.

Referring to FIG. 9(a), if a touch to a first point 901 within a display region of a prescribed message with a first chat counterpart (e.g., 'HONG Gil Dong' shown in FIG. 9(a)) and a second point 902 within a display region of a profile of a second chat counterpart (e.g., 'Mike' shown in FIG. 9(a)) is input, the controller 180 can attempt extraction of personal information data from a first message with the first chat counterpart specified by the touch to the first point 901.

If the personal information data is extracted from the first message, the controller 180 can update contact data of the second chat counterpart specified by the touch to the second point 902 based on the extracted personal information data. In particular, referring to FIG. 9(b), the controller 180 can insert the email address 'abc@abc.com' extracted from the first message in an email address field value of the second chat counterpart 'Mike'.

If the contact data of the second chat counterpart is not saved in a phonebook database or it is unable to extract the contact data of the second chat counterpart from the phonebook database, as mentioned in the foregoing description with reference to FIG. 8, it may be able to newly create contact data of the second chat counterpart based on the extracted personal information data.

<Extraction of Time Information Data>

If time information data is extracted from a first message, the controller 180 can control a schedule with a chat counterpart to be added at the data and hour indicated by the extracted time information data. This is described in detail with reference to FIG. 10 as follows.

Figure 10:
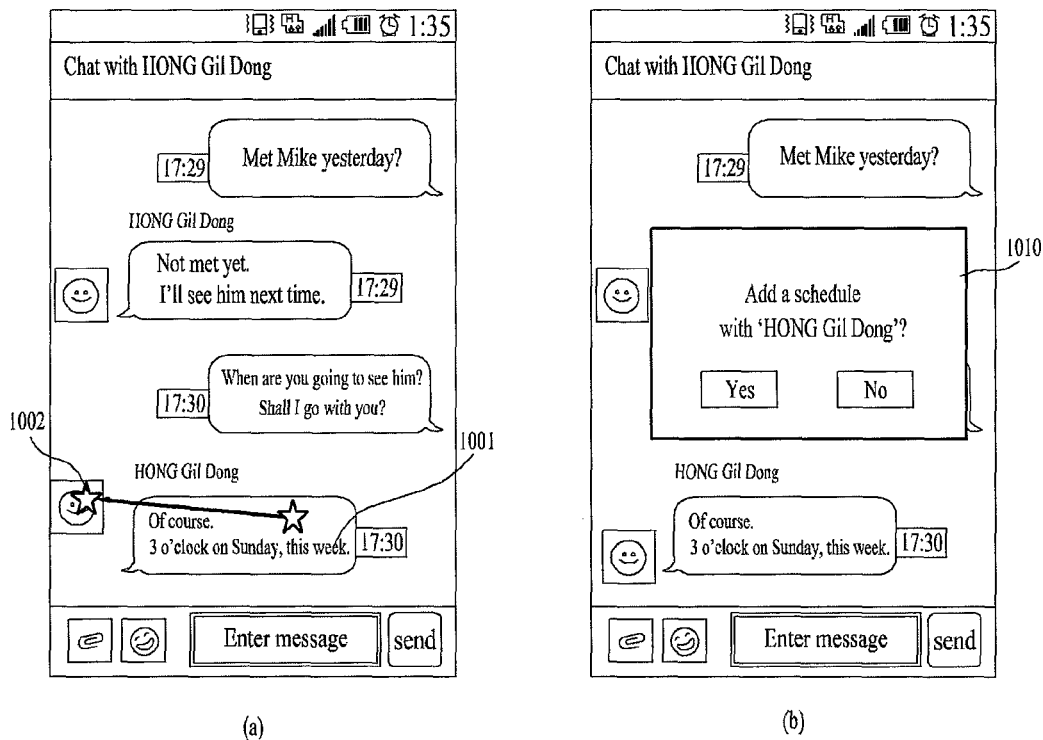
FIGS. 10(a) to 10(c) are diagrams illustrating one example to describe a process for adding a schedule with a chat counterpart based on extracted time information data.

FIG. 10 is a diagram illustrating one example to describe a process for adding a schedule with a chat counterpart based on extracted time information data. As mentioned in the foregoing description with reference to FIG. 7, assume that a first touch input for specifying a first message is performed by a touch to a first point 1001 within a display region of a prescribed message and a second point 1002 within a display region of a profile of a chat counterpart.

Referring to FIG. 10(a), if a touch to a first point 1001 within a display region of a prescribed message and a second point 1002 within a display region of a profile of a chat counterpart is input, the controller 180 can attempt extraction of personal information data from a first message.

In this instance, the time information data is related to a text string indicating at least one of a specific hour, a specific date and a specific weekday. In addition, the controller 180 can extract the time information data from the text string associated with such a time as a date, an hour, a weekday and the like from the first message specified by the touch to the first point 1001. For instance, in the example shown in FIG. 10(a), the controller 180 can extract a text string 'Sunday of this week' indicating a specific weekday and a text string '3 o'clock' indicating a specific hour as the time information data from a text string '3 o'clock, Sunday of this week'.

If the time information data is extracted from the first message, the controller 180 can control a schedule with the chat counterpart to be added to the day and time indicated by the extracted time information data. Prior to adding the schedule with the counterpart to the day and time indicated by the extracted time information data, referring to FIG. 10(b), the controller 180 can control a popup window 1010, which is provided to enable a user to select whether to add the schedule with the chat counterpart, to be displayed. In this instance, the controller 180 can determine whether to add the schedule with the chat counterpart to the day and time indicated by the extracted time information data based on a user input to the popup window 1010 shown in FIG. 10(b). However, displaying the popup window 1010 shown in FIG. 10(b) is an optional step only.

Since the timing point indicated by the extracted time information data is '3 o'clock, Sunday of this week' in the example shown in FIG. 10(a), referring to FIG. 10(c), the controller 180 can control the schedule with the chat counterpart to be added to 3 o'clock on the date (e.g., September 2 in FIG. 10(c)) corresponding to the coming Sunday. In adding the schedule with the chat counterpart, the controller 180 can control an identification information of the chat counterpart to be included in the name of the added schedule. For instance, referring to FIG. 10(c), the controller 180 controls a nickname of the chat counterpart to be included in the name of the schedule, thereby facilitating a schedule of a schedule table to be determined as a schedule with which chat counterpart.

Although FIG. 10(c) shows one example of the nickname of the chat counterpart as the identification information of the chat counterpart included in the name of the schedule, the identification information of the chat counterpart may include at least one of a name and phone number of the chat counterpart.

If two dates or weekdays indicating a start day and an end day are extracted from the first message or a text string (e.g., 'during', 'through', etc.) indicating a prescribed period is extracted from the first message, the controller 1809 can add a schedule with a chat counterpart to all dates between the start day and the end day or in the prescribed period.

If a place information data is included in the first message, the controller 180 extracts the place information data from the first message and can then control the extracted place information data to be added to a schedule with a chat counterpart.

For instance, if such a text related to such an administrative district as 'Gu', 'Gun', 'Do', 'Si', 'Teukbyul Si', 'Gwangyeok Si', 'Eub', 'Myun', 'Dong', 'State', 'Street', 'Avenue' and the like is included in the first message, the controller 180 can extract a text string, which is determined as indicating an address, as the place information data.

In the example shown in FIG. 10(c), such a field value, which cannot be extracted from the text string included in the first message, as 'notification' and the like can be manually input by a user input. If it is unable to extract the place information data from the first message, a place field value may be manually input by a user input as well. When notification is set for a schedule, if a current hour becomes a set notification time, the controller 180 controls such an alarm as vibration, alarm sound and the like to be output or can control an event (e.g., an email transmission to a user account, a text message transmission to the mobile terminal 100, etc.) to occur.

The controller 180 can specify the day and time indicated by the time information data based on such a text string as 'month', 'week', 'day', 'weekday', 'hour', 'minute', 'morning', 'afternoon', 'A.M.', 'P.M.', and the like. For instance, in the example shown in FIG. 10(a), since units of 'week' and 'day' can be specified as 'this week' and 'Sunday', respectively, the schedule with the chat counterpart can be specified as added to the date indicated by 'Sunday, this week'.

However, when a time related text string failing in clarifying A.M. and P.M. like the text string '3 o'clock' shown in FIG. 10(a), the controller 180 controls a popup window, which is provided to ask a user whether an extracted time is A.M. or P.M., to be output or can automatically determine either A.M. or P.M. based on user's life pattern. For instance, if the extracted data indicates 9 o'clock, 10 o'clock or 11 o'clock, the controller 180 automatically determines that the extracted time is A.M.

For the rest of time, the controller 180 can automatically determine that the extracted time is P.M. In extracting the time information data, it may be unnecessary to extract both of the date and the hour. Even if either the date or the hour is extracted, it is able to add the schedule with the chat counterpart. In doing so, the controller 180 can automatically determine the date or hour to which the schedule will be added.

The mobile terminal 100 according to one embodiment of the present invention discriminates indicating a specific time in the future and indicating a specific time in the past from each other. Hence, the mobile terminal 100 according to one embodiment of the present invention can control a schedule with a chat counterpart to be added only if a time information data indicating the specific time in the future is extracted.

For instance, if the first message includes such a text string for representing a past time as 'last week', 'yesterday', 'last month' and the like, the controller 180 can prevent a schedule with a chat counterpart from being added using the first message. However, despite that a text string for representing a past time is included in the first message, if such a text string related to a periodically repeated event as 'birthday', 'ceremony', 'monthly', 'weekly' and the like exists in the first message, the controller 180 can add a schedule with a chat counterpart to a time at which a next event occurs.

If the time information data extracted from the first message fails in clearly representing a past time or a future time, the controller 180 may handle the extracted time information data as the future time. For instance, if a present date is Sep. 1, 2012 and the date extracted from the first message is described as August 1 only without representing a corresponding year, the controller 180 can control a schedule with a chat counterpart to be added to 'Aug. 1, 2013' corresponding to a time indicated by the extracted data, which comes earliest from the current date.

Likewise, if a current time is '3 PM, Sep. 1, 2012' and the time extracted from the first message is '10 AM' without representing day, month and year, the controller 180 can control a schedule with a chat counterpart to be added to '10 AM, Sep. 2, 2012' corresponding to a time indicated by the extracted data, which comes earliest from the time.

According to the above-described example, after the time information data has been extracted from the first message, the place information data is extracted. However, unlike the above description, it may be unnecessary for the place information data to be extracted after extracting the time information data. Even if the time information data is not extracted from the first message, the extraction of the place information data can be attempted. Even if the place information data is extracted from the first message without extracting the time information data, a schedule with a counterpart can be added. In this instance, a start time of the schedule may be set up manually by a user.

Moreover, as mentioned in the foregoing description with reference to FIG. 9, if the mobile terminal 100 transceives messages with a plurality of chat counterparts, the controller 100 can add a schedule with one chat counterpart using the message with another chat counterpart. For instance, if the chat counterparts during chatting with the mobile terminal 100 are defined as a first chat counterpart and a second chat counterpart, the controller 180 can add a schedule with the second chat counterpart to the day and time indicated by a time information data extracted from a message with the first chat counterpart.

If a schedule with a chat counterpart is added, the added schedule with the chat counterpart can be linked to a schedule management application. Hence, it is able to check the added schedule with the chat counterpart using the schedule management application. As representative schedule management applications, there are 'Calendar' supported by iOS, 'Calendar' supported by Android OS, 'Calendar' supported by Windows OS and the like. Moreover, the present invention is applicable to various kinds of schedule management applications as well as to the above-enumerated schedule management applications.

Once the schedule management application is activated, the controller 180 can control an added schedule with a chat counterpart to be displayed on a calendar while displaying the calendar. This is described in detail with reference to FIG. 11 as follows.

Figure 11:
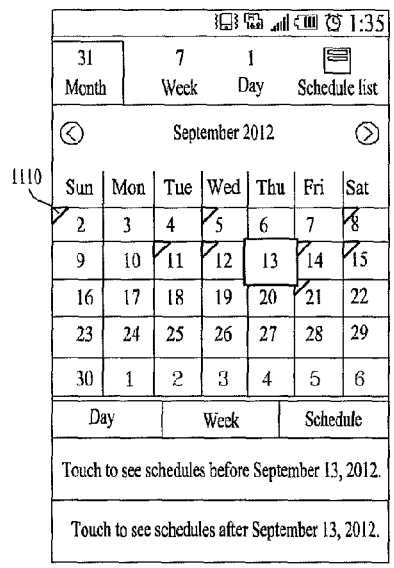
FIGS. 11(a) to 11(e) are diagrams illustrating one example to describe a schedule management application according to the present invention.
Figure 11:
Figure 11:
Figure 11:
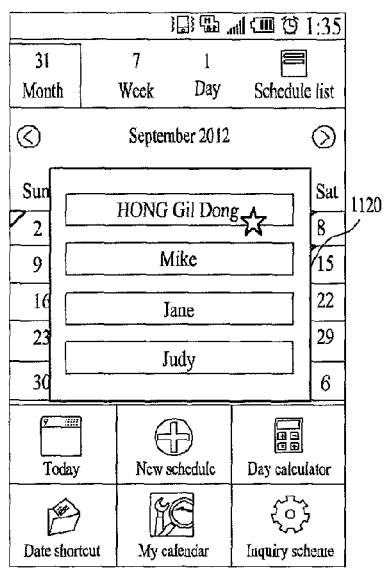
Figure 11:

FIG. 11 is a diagram illustrating one example to describe a schedule management application according to the present invention. Referring to FIG. 11(*a*), while the controller 180 displays a calendar, it is able to control dates to be displayed in a manner that a scheduled date is visually discriminated from an unscheduled date. For instance, in the example shown in FIG. 11(*a*), the controller 180 controls an identification indicator (e.g., an identification indicator 1110 of a triangular shape displayed on a left top corner of a date display region shown in FIG. 11(*a*)) to be displayed on a display region of a date having a planned schedule, thereby controlling the scheduled date and the unscheduled date to be displayed in a manner of being visually discriminated from each other.

When schedules with a plurality of chat counterparts are saved in the memory 160, the controller 180 can control the schedule with the chat counterpart selected from a plurality of the chat counterparts to be displayed on the touchscreen only. For instance, referring to FIG. 11(*b*) and FIG. 11(*c*), a schedule inquiry scheme is set to 'per person'. If so, referring to FIG. 11(*d*), the controller 180 can control a popup window 1120, which is provided to select at least one of a plurality of the chat counterparts, to be displayed.

If the at least one chat counterpart is selected from the popup window 1120 shown in FIG. 11(*d*), the controller 180 can control the schedule with the chat counterpart, who is selected from the popup window 120 shown in FIG. 11(*d*), among the schedules with a plurality of the chat counterparts to be displayed only. For instance, since 'HONG Gil Dong' is selected as a chat counterpart in FIG. 11(*d*), referring to FIG. 11(*d*), the controller 180 can control the schedule with 'HONG Gil Dong' to be displayed on the calendar only.

<Memo Related Keyword Extraction>

If a text string categorized into a personal information data or a time information data does not exist in a first message, the controller 180 can extract a memo related keyword from the first message. In this instance, the memo related keyword is provided to recognize various situations (e.g., an appointment with a chat counterpart, a request from a chat counterpart, a request to a chat counterpart, etc.) in association with a chat counterpart. In order to extract the memo related keyword from the first message, a memo related keyword database may be saved in the memory 160. In this instance, the controller 180 can attempt to extract a memo related keyword matching the memo related keyword database from the first message using the memo related keyword database. This is described in detail with reference to FIG. 12 as follows.

Figure 12:
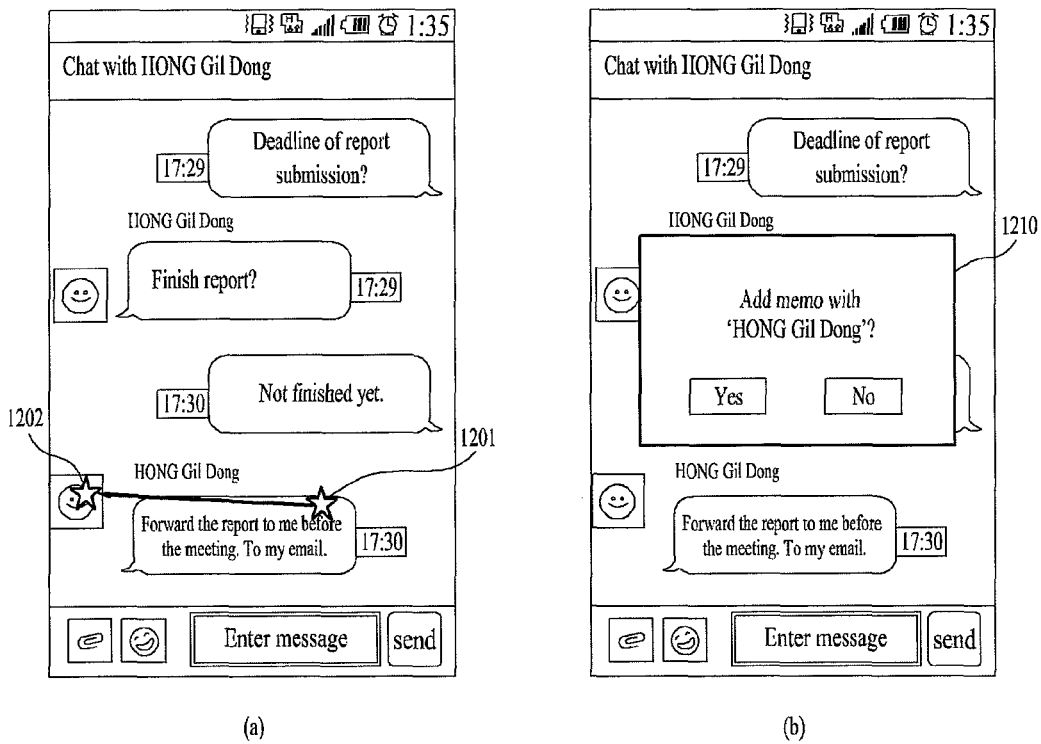
FIGS. 12(a) to 12(d) are diagrams illustrating one example to describe a process for adding a memo of a chat counterpart based on an extracted memo related keyword.
Figure 12:
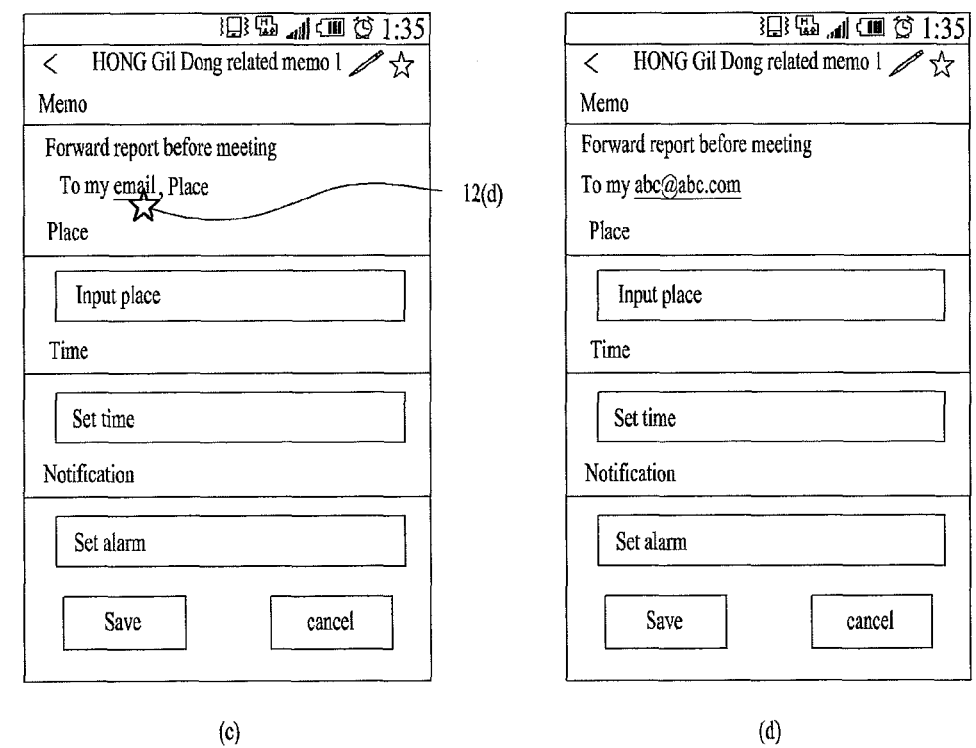

FIG. 12 is a diagram for one example to describe a process for adding a memo of a chat counterpart based on an extracted memo related keyword. For clarity of the following description of the example shown in FIG. 12, assume that a memo related keyword included in a memo related keyword database is 'meeting'.

Referring to FIG. 12(*a*), if a touch to a first point 1201 within a display region of a prescribed message and a second point 1202 within a display region of a profile of a chat counterpart is input, the controller 180 can attempt extraction of a memo related keyword included in a memo related keyword database from a first message. Since the memo related keyword 'meeting' included in the memo related keyword database is included in the first message shown in FIG. 12(*a*), the controller 180 may be able to extract the memo related keyword 'meeting' from the first message.

If the memo related keyword is extracted from the first message, the controller 180 can save at least one portion of the first message as a memo of the chat counterpart. Prior to saving the at least one portion of the first message as the memo of the counterpart, referring to FIG. 12(*b*), the controller 180 can control a popup window 1210, which is provided to enable a user to select whether to save the at least one portion of the first message as the memo of the chat counterpart, to be displayed. In this instance, the controller 180 can determine whether to add the at least one portion of the first message to the memo of the chat counterpart based on a user input to the popup window 1210 shown in FIG. 12(*b*). However, displaying the popup window 1210 shown in FIG. 12(*b*) is an optional step only.

If the memo related keyword is extracted from the first message, referring to FIG. 12(*c*), the controller 180 can control the at least one portion of a content included in the first message to be saved as the memo of the chat counterpart. Although FIG. 12(*c*) shows one example that a text string included in the first message is saved as the memo of the chat counterpart, if such a multimedia file as an image, a video and the like is attached to the first message, the multimedia file such as the image, the video and the like may be inserted in the first memo.

In saving the text string included in the first message as the memo of the chat counterpart, such a field value, which cannot be automatically extracted from the first message, as an alarm, a place, a time and the like can be manually input by a user input. If notification is set for the memo, if a current hour becomes a notification time, the controller 180 may control such an alarm as a vibration, an alarm sound and the like to be output or may control such an event (e.g., an email transmission to a user account, a text message transmission to the mobile terminal 100, etc.) to occur.

In creating the memo of the chat counterpart based on the first message, if a text string indicating a contact of a prescribed counterpart is included in the text strings included in the memo, the controller 180 can control the contact of the counterpart to be linked to the text string indicating the contact of the prescribed counterpart.

For instance, referring to FIG. 12(*c*), since a word 'email' is included in the first message added as the memo of the chat counterpart, the controller 180 can control an email address of the chat counterpart to be linked to the word 'email'. In another instance (not shown in the drawing, if such a text string as 'phone', 'phone number', 'number' and the like is included in the first message, the controller 180 can control a phone number of a prescribed counterpart to be linked to the above-enumerated text string.

Therefore, if the text string indicating a contact of the prescribed counterpart is touched, referring to FIG. 12(*d*), the controller 180 can control a text string 'abc@abc.com' to be exposed by replacing the text string 'email'. In the example shown in FIG. 12(*d*), if the contact of the prescribed counterpart is touched, the controller 180 can perform an operation to make a contact with the contact of the prescribed counterpart.

According to another embodiment of the present invention, unlike the example shown in FIG. 12(*d*), in the example shown in FIG. 12(*c*), if the text string indicating the contact of the prescribed counterpart is touched, the controller 180 may take an action to make a contact with the contact of the prescribed counterpart linked to the text string. In this instance, the action to make the contact can include at least one of an action of outputting an email write screen having a linked email address set as a destination and an action of connecting a call to a linked phone number.

Moreover, as mentioned in the foregoing description with reference to FIG. 9, if the mobile terminal 100 transceives messages with a plurality of chat counterparts, the controller 180 can add a memo for one chat counterpart using the message with another chat counterpart. For instance, when the chat counterparts currently having a chat with the mobile terminal 100 are defined as a first chat counterpart and a second chat counterpart, respectively, if a memo related keyword is extracted from the message with the first chat counterpart, the controller 180 can add the message with the first chat counterpart as the memo for the second chat counterpart.

If the memo for the chat counterpart is added, the added memo with the chat counterpart can be associated with a memo application. Hence, it is able to check the added memo for the chat counterpart using the memo application. Once the memo application is activated, a memo with a prescribed chat counterpart in a memo list can be displayed on the touchscreen only. This is described with reference to FIG. 13 as follows.

Figure 13:
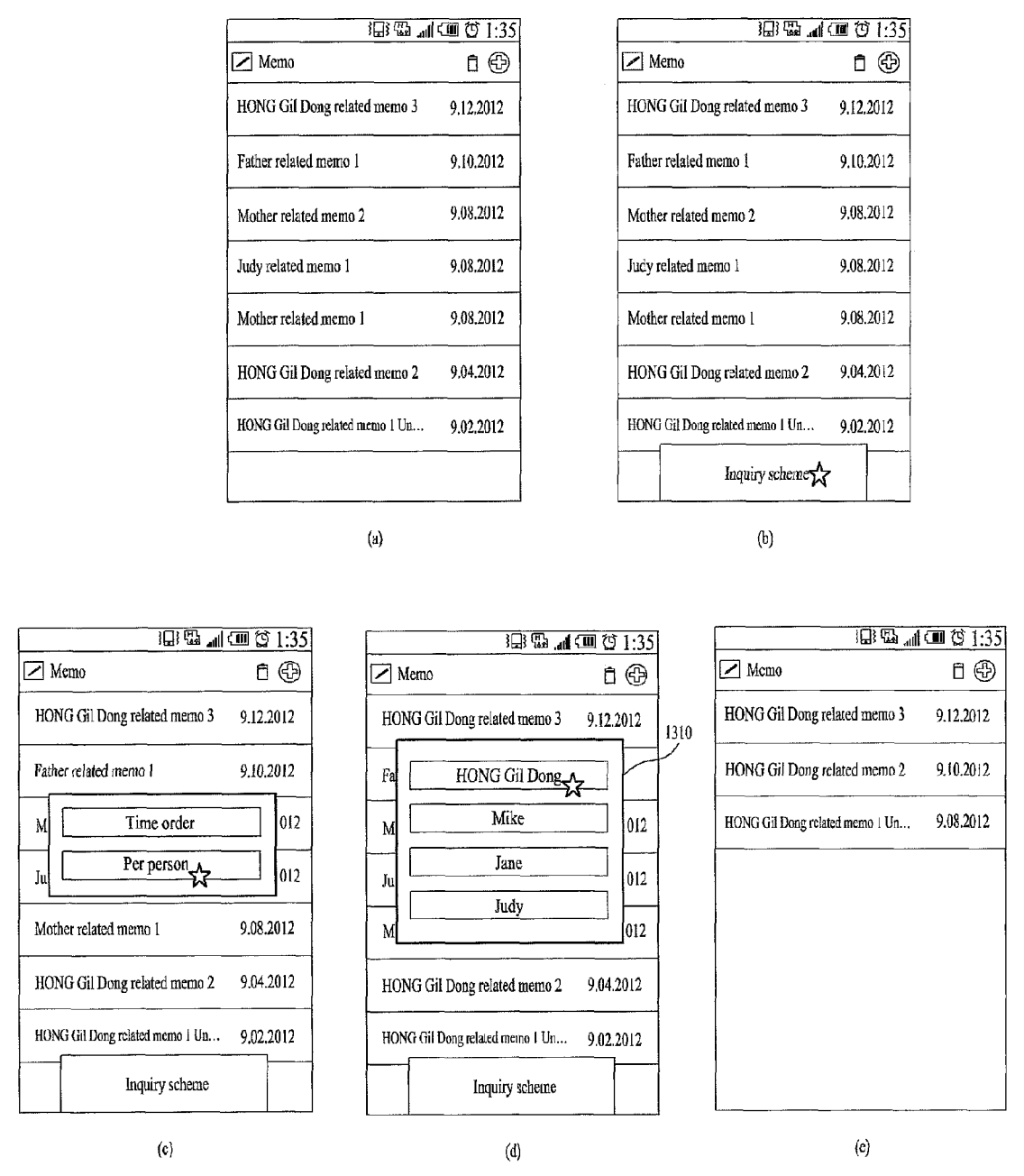

FIG. 13 is a diagram to describe a memo application according to an embodiment of the present invention. If a memo application is activated, referring to FIG. 13, the controller 180 can display a memo saved in the memory 160.

If memos with a plurality of counterparts are saved in the memory 160, the controller 180 can control the memo with at least one of a plurality of the counterparts to be displayed on the touchscreen. For instance, if a memo inquiry scheme is set to 'per person' (FIG. 13(b), FIG. 13(c)), the controller 180 can control a popup window 1310, which is provided to select at least one of a plurality of the counterparts, to be displayed (FIG. 13(d)).

If at least one counterpart is selected from the popup window 1310 shown in FIG. 13(d), referring to FIG. 13(e), the controller 180 may control the memo with the selected counterpart to be displayed among the memos with a plurality of the counterparts. Since 'HONG Gil Dong' is selected in FIG. 13(d), the controller 180 may control the memo for 'HONG Gil Dong' to be displayed on the touchscreen only among a plurality of the counterparts.

When attempting to extract personal information data, time information data and a memo related keyword from a first message, the controller 180 can attempt extraction of at least one of the personal information data, the time information data and the memo related keyword in accordance with preset priorities. For instance, when the priorities are set in order of the personal information data, the time information data and the memo related keyword, the controller 180 may attempt the extraction of the time information data from the first message if the personal information data is not extracted.

If both of the personal information data and the time information data are not extracted from the first message, the controller 180 may attempt the extraction of the memo related keyword. The priorities of the personal information data, the time information data and the memo related keyword may be non-limited by the above-described example. In addition, it is able to set up the priorities to various combinations.

When at least one of a schedule and memo for a chat counterpart exists, in one of i) displaying contact data of a chat counterpart on displaying a list of counterparts included in a phonebook database, ii) displaying a list of chat available counterparts using an instant message, iii) displaying a profile of a chat available counterpart, and iv) displaying a content of a chat with a chat counterpart, the controller 180 can display an object to indicate that at least one of the schedule and the memo for the chat counterpart exists. For clarity of the following description, an object to indicate that a schedule with a chat counterpart exists is named a first object and an object to indicate that a memo for a chat counterpart exists is named a second object. In the following description, a process for displaying at least one of a first object and a second object on a touchscreen is explained in detail with reference to the accompanying drawings.

Figure 14:
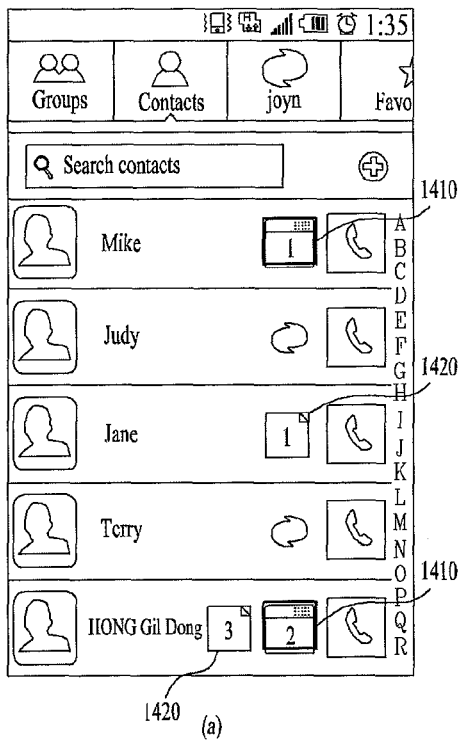
FIGS. 14(a) to 14(c) are diagrams to describe a process for displaying at least one of a first object and a second object on a display screen of a counterpart list included in a phonebook database.
Figure 14:
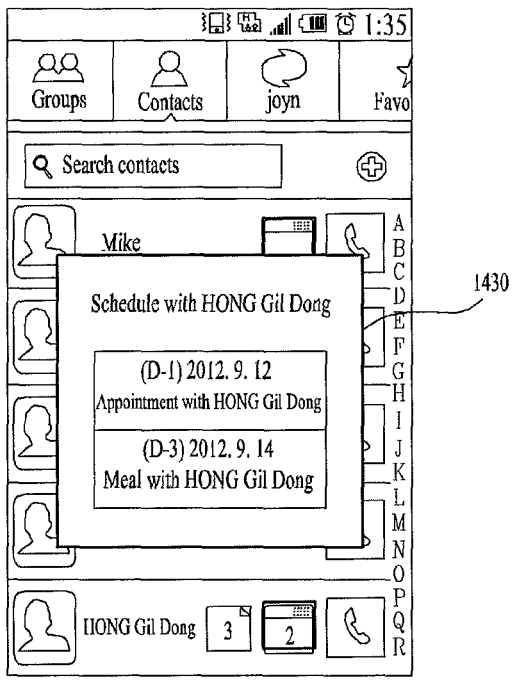
Figure 14:
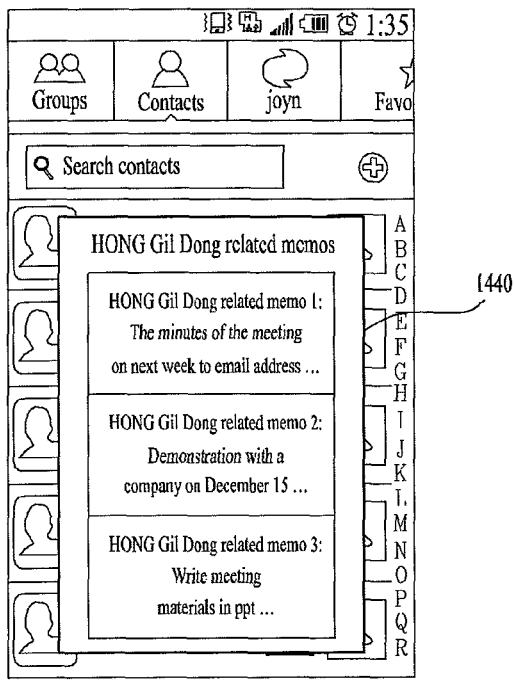

FIG. 14 is a diagram to describe a process for displaying at least one of a first object and a second object on a display screen of a counterpart list included in a phonebook database. Referring to FIG. 14(a), when a counterpart list included in a phonebook database is displayed, in order to indicate that at least one of a schedule with a chat counterpart and a memo for the chat counterpart exists, the controller 180 can control a first object 1410 to be displayed on a region for displaying the chat counterpart in the counterpart list.

In the example shown in FIG. 14, because the first object 1410 and a second object 1420 are located in a region for displaying 'HONG Gil Dong', a user can recognize that a schedule and memo for 'HONG Gil Dong' have been added. Because the first object 1410 is located in a region for displaying 'Mike' and the second object 1420 is located in a region for displaying 'Jane', the user can recognize that a schedule with 'Mike' and a memo for 'Jane' exist.

Although FIG. 14(a) shows one example that each of the first object 1410 and the second object 1420 is displayed as an icon, each of the first object 1410 and the second object 1420 can be displayed as at least one of a text, an image and a combination of the text and image instead of being displayed as the icon.

When displaying at least one of the first object 1410 and the second object 1420 on a display region of a chat counterpart, the number of schedules with the corresponding chat counterpart and the number of memos for the corresponding chat counterpart can be displayed on each of the first object 1410 and the second object 1420. For instance, if the number of schedules with the chat counterpart 'HONG Gil Dong' and the number of memos for the chat counterpart 'HONG Gil Dong' are 2 and 3 in FIG. 14(a), respectively, the controller 180 controls the numeral '2' and the numeral '3' to be displayed on the first object 1410 and the second object 1420, respectively.

In the example shown in FIG. 14(a), if one of the first object 1410 and the second object 1420 is touched, the controller 180 can display a popup window, on which at least one of a schedule and memo for a chat counterpart is displayed. For instance, if the first object 1401 located in the display region of 'HONG Gil Dong' is touched (FIG. 14(a)), the controller 180 can display a popup window 1430, on which the schedules with 'HONG Gil Dong' are displayed (FIG. 14(b)). In doing so, if a prescribed one of the schedules displayed on the popup window 1430 shown in FIG. 14(b) is touched, the controller 180 activates a schedule application and can display a screen, which is provided to check details of the touched schedule.

In another instance, if the second object 1402 located in the display region of 'HONG Gil Dong' is touched (FIG. 14(a)), the controller 180 can display a popup window 1440, on which the memos for 'HONG Gil Dong' are displayed (FIG. 14(c)). In doing so, if a prescribed one of the memos displayed on the popup window 1440 shown in FIG. 14(c) is touched, the controller 180 activates a memo application and can display a screen, which is provided to check details of the touched memo.

In displaying the first object 1410 on a display region of a prescribed counterpart, if a start date of a schedule with the prescribed counterpart is a present date or the schedule with the prescribed counterpart is estimated to start in a preset period, the controller 180 can give a visual effect to the first object 1410 in order to indicate that the schedule with the prescribed counterpart is about to start soon. In this instance, the visual effect given to the first object 1410 can be variously represented as one of a color change of the first object 1410, a blinking (or flickering) effect of the first object 1410 and the like.

Although FIG. 14(a) shows one example that the number of schedules with the chat counterpart is displayed on the first object 1410, the controller 180 can control D-day of the schedule with the chat counterpart to be displayed on the first object 1410 instead of or together with the number of the schedules. In doing so, if there are a plurality of schedules with the chat counterpart, the controller 180 can control the D-day of the schedule, which arrives in an earliest time among a plurality of the schedules, to be displayed.

For instance, when there are 3 schedules with a prescribed counterpart, if D-days of the 3 schedules are the $20^{th}$, the $2^{nd}$ and $10^{th}$, the controller 180 can control 'second', which is the D-day of the schedule arriving in the earliest time, to be displayed on the first object 1410. However, it is not mandatory for a display position of the D-day to be situated on the first object 1410. For example, the D-day may be displayed on a remaining region of the display region of the prescribed counterpart except the display region of the first object 1410. Alternatively, the D-day can be displayed on the popup window for displaying the summary of the schedules like the example shown in FIG. 14(b). Although FIG. 14(b) shows one example that the popup window of the text type is displayed, a popup window of a calendar type for displaying schedules with a chat counterpart can be displayed.

Moreover, according to the above-described example, the number of schedules and the number of memos are displayed on the first object 1410 and the second object 1420, respectively. However, it may be unnecessary for the number of schedules and the number of memos to be displayed on the first object 1410 and the second object 1420, respectively. For example, the number of schedules and the number of memos can be displayed on a remaining region of a display region of a prescribed counterpart except the display regions of the first object 1410 and the second object 1420. In another example, the controller 180 can control the number of schedules with a prescribed counterpart and the number of memos for the prescribed counterpart to be displayed on the popup window for displaying the summarized schedules shown in FIG. 14(b) or the popup window for displaying the summarized memos shown I FIG. 14(c).

Figure 15:
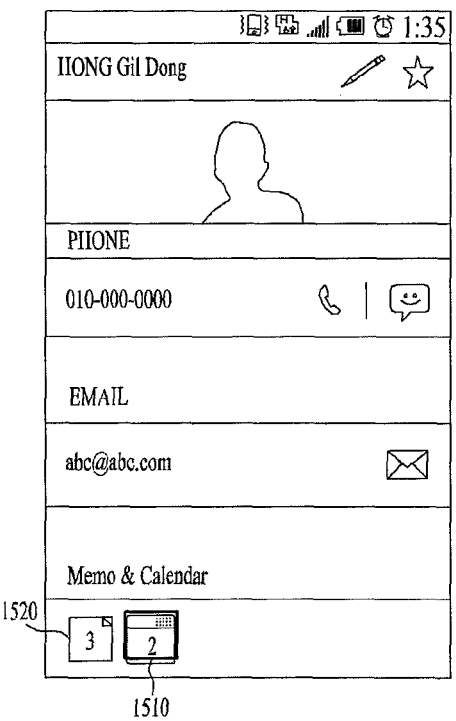
FIG. 15 is a diagram illustrating one example to describe a process for displaying at least one of a first object and a second object on a screen for displaying contact data of a chat counterpart.

FIG. 15 is a diagram for one example to describe a process for displaying at least one of a first object and a second object on a screen for displaying contact data of a chat counterpart. Referring to FIG. 15, if a display region of a prescribed counterpart except the display regions of the first object 1410 and the second object 1420 is touched in the example shown in FIG. 14(a), the controller 180 can control a screen, on which contact data of the selected prescribed counterpart is displayed, to be displayed.

If at least one of a schedule with the prescribed counterpart and a memo for the prescribed counterpart exists, the controller 180 can control at least one of a first object 1510 and a second object 1520, which are provided to indicate that at least one of the schedule with the prescribed counterpart and the memo for the prescribed counterpart exists, to be displayed on the screen for displaying the contact data of the prescribed counterpart.

The former description of the first object 1410 and the second object 1420 with reference to FIG. 14 may be exactly applicable to the first object 1510 and the second object 1520 shown in FIG. 15. For instance, as mentioned in the foregoing description with reference to FIG. 14, the number of schedules and the number of memos can be displayed on the first object 1510 and the second object 1520, respectively. If the first object 1510 is touched, a popup window for displaying summarized schedules can be displayed. If the second object 1520 is touched, a popup window for displaying summarized memos can be displayed. In addition, in order to indicate that a schedule with a prescribed counterpart is about to start soon, a visual effect can be given to the first object 1510.

Figure 16:
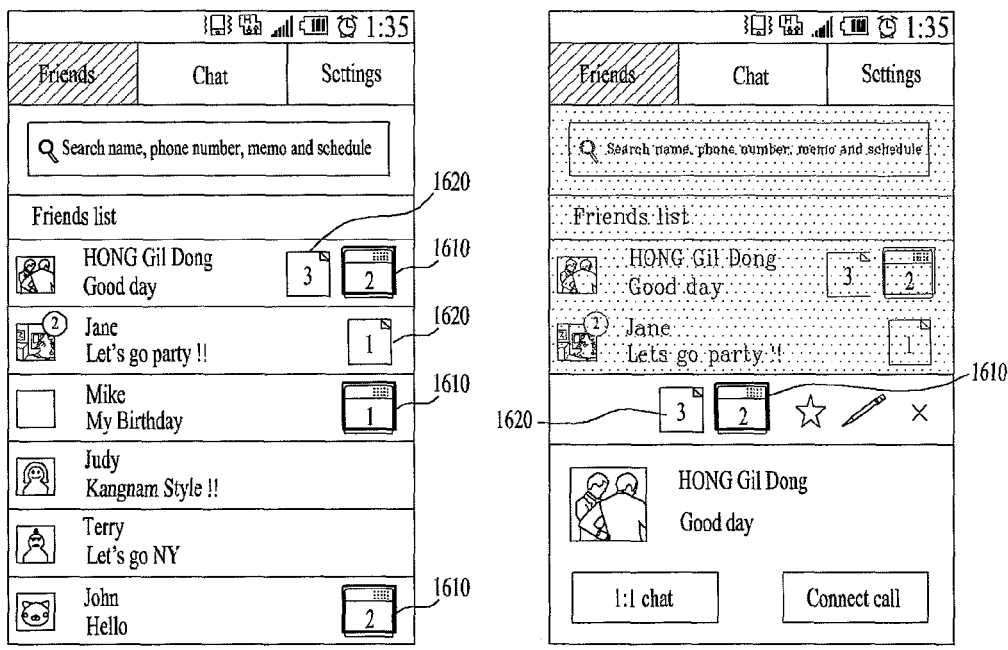
FIGS. 16(a) and 16(b) are diagrams illustrating one example to describe a process for displaying at least one of a first object and a second object on a screen for displaying a list of chat-available counterparts using an instant message.

FIG. 16 is a diagram for one example to describe a process for displaying at least one of a first object and a second object on a screen for displaying a list of chat-available counterparts using an instant message. Referring to FIG. 16(a), if a mobile messenger or RCS for transceiving instant messages is activated, the controller 180 can control a screen, on which a list of chat available counterparts is displayed, to be displayed. In displaying the list of the chat available counterparts, the controller 180 can control a first object 1610 and a second object 1620 to be displayed for each counterpart having a schedule and a memo.

Referring to FIG. 16(b), if an inside of a display region of a prescribed counterpart except display regions of the first object 1610 and the second object 1620 is touched, the controller 180 can control a screen, on which a profile information of the selected prescribed counterpart is displayed, to be displayed. If at least one of a schedule with the selected prescribed counterpart and a memo for the selected prescribed counterpart exists, the controller can control at least one of the first object 1610 and the second object 1620 to be displayed in order to indicate that at least one of the schedule with the selected prescribed counterpart and the memo for the selected prescribed counterpart exists.

The former description of the first object 1410 and the second object 1420 with reference to FIG. 14 may be exactly applicable to the first object 1610 and the second object 1620 shown in FIG. 16. For instance, as mentioned in the foregoing description with reference to FIG. 14, the number of schedules and the number of memos can be displayed on the first object 1610 and the second object 1620, respectively. If the first object 1610 is touched, a popup window for displaying summarized schedules can be displayed. If the second object 1620 is touched, a popup window for displaying summarized memos can be displayed. In addition, in order to indicate that a schedule with a prescribed counterpart is about to start soon, a visual effect can be given to the first object 1610.

Figure 17:
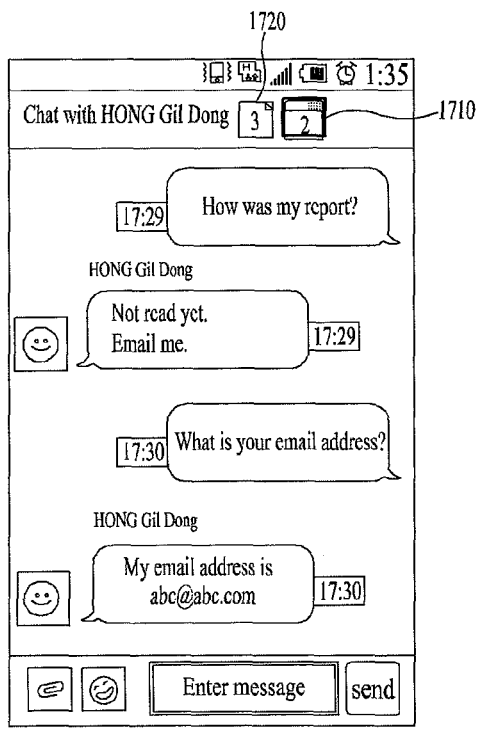
FIG. 17 is a diagram illustrating one example to describe a process for displaying a first object and a second object on a screen for displaying contents of a chat with a counterpart.

FIG. 17 is a diagram for one example to describe a process for displaying a first object and a second object on a screen for displaying contents of a chat with a counterpart. Referring to FIG. 17, in displaying text messages or instant messages transceived with a prescribed chat counterpart, if at least one of a schedule with the prescribed counterpart and a memo for the prescribed counterpart exists, the controller 180 can control at least one of a first object 1710 and a second object 1720, which are provided to indicate that at least one of the schedule with the prescribed counterpart and the memo for the prescribed counterpart exists, to be displayed.

The former description of the first object 1410 and the second object 1420 with reference to FIG. 14 may be exactly applicable to the first object 1710 and the second object 1720 shown in FIG. 17. For instance, as mentioned in the foregoing description with reference to FIG. 14, the number of schedules and the number of memos can be displayed on the first object 1710 and the second object 1720, respectively. If the first object 1710 is touched, a popup window for displaying summarized schedules can be displayed. If the second object 1720 is touched, a popup window for displaying summarized memos can be displayed. In addition, in order to indicate that a schedule with a prescribed counterpart is about to start soon, a visual effect can be given to the first object 1710.

As mentioned in the foregoing descriptions with reference to FIG. 14 and FIG. 17, if at least one of a schedule with a prescribed counterpart and a memo for the prescribed counterpart exists, the controller 180 can control at least one of a first object and a second object to be displayed on the touchscreen. In addition, in at least one of displaying a list of counterparts included in a phonebook database and displaying a list of chat available counterparts using an instant message, the controller 180 extracts a schedule having a start date set to a present date or a schedule estimated to start in a preset period and can then display a prescribed counterpart mapped to the extracted schedule in a manner of grouping the prescribed counterpart separately. This is described in detail with reference to FIG. 18 as follows.

Figure 18:
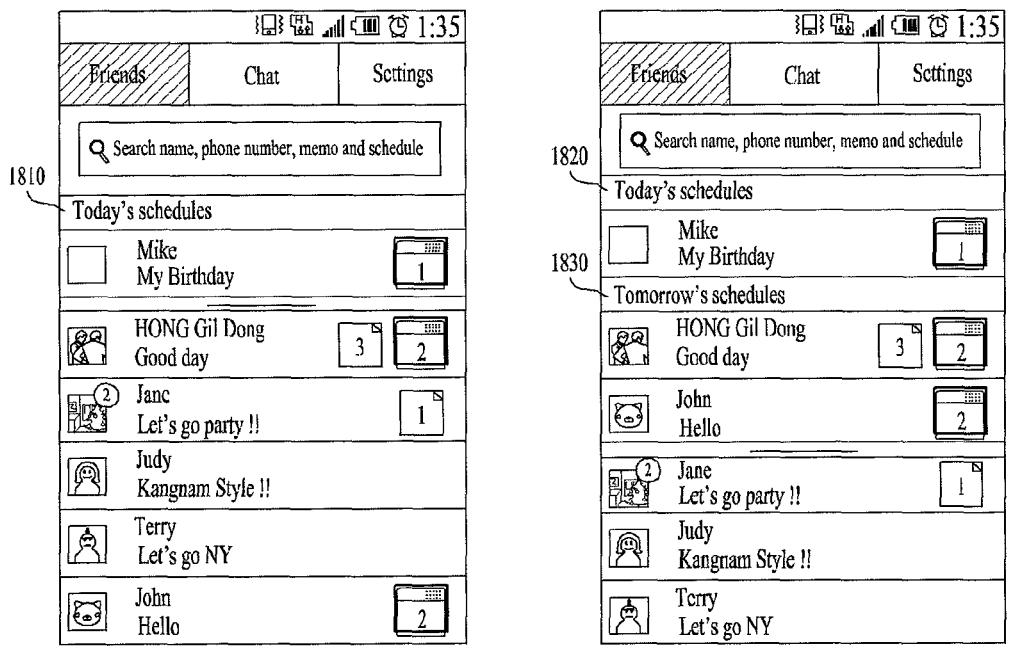
FIGS. 18(a) and 18(b) are diagrams illustrating one example to describe a process for displaying a prescribed counterpart, who is mapped to a schedule expected to start on a present date or in a preset period, as a separate group.

FIG. 18 is a diagram for one example to describe a process for displaying a prescribed counterpart, who is mapped to a schedule expected to start on a present date or in a preset period, as a separate group. For instance, referring to FIG. 18(*a*), by grouping a prescribed counterpart mapped to a schedule having a start date set to a present date, it is able to control the corresponding group to be separately displayed on a counterpart list. In the example shown in FIG. 18(*a*), a user 'Mike' mapped to a schedule having a start date set to a present date belongs to a group 'Today's schedules' 1810.

In another instance, referring to FIG. 18(*b*), the controller 180 groups a prescribed counterpart mapped to a schedule having a start date set to a present date into a first group and also groups a prescribed counterpart mapped to a schedule starting on a next date into a second group, thereby displaying the first group and the second group on the counterpart list separately. In the example shown in FIG. 18(*b*), a user 'Mike' mapped to a schedule having a start date set to a present date belongs to a first group 1820 named 'Today's schedules' and users 'HONG Gil Dong' and 'John' mapped to schedules having a start date set to a next date belong to a second group 1830 named 'Tomorrow's schedules'.

Like the example shown in FIG. 18, a user mapped to a schedule supposed to start in a prescribed period is displayed in a manner of being grouped into a separate group, thereby providing a user with the facilitation of schedule management.

Moreover, the controller 180 can provide a search function of searching for a schedule or memo. For instance, when a user inputs a text string of a date type as a search word, the controller 180 can extract a schedule on a date indicated by the input search word or a memo including a text string corresponding to the input search word. If a prescribed text is input as a search word, the controller 180 can extract a schedule having the input search word included in a schedule name or a description of the schedule or a memo including a text string corresponding to the input search word. This is described in detail with reference to FIG. 19 as follows.

Figure 19:
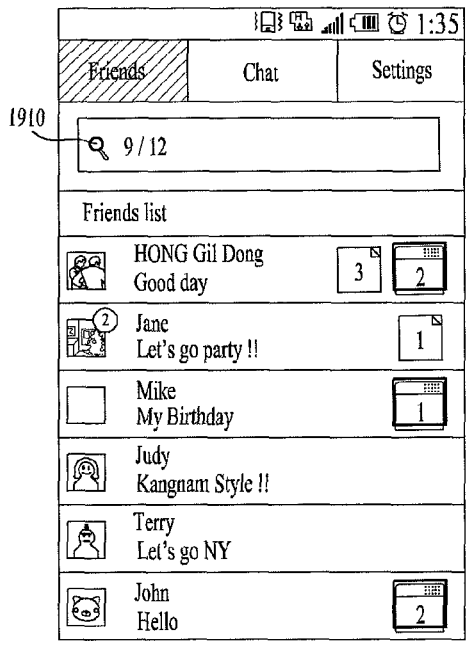
FIGS. 19(a) to 19(d) are diagrams illustrating one example to describe a schedule or memo searching function.
Figure 19:
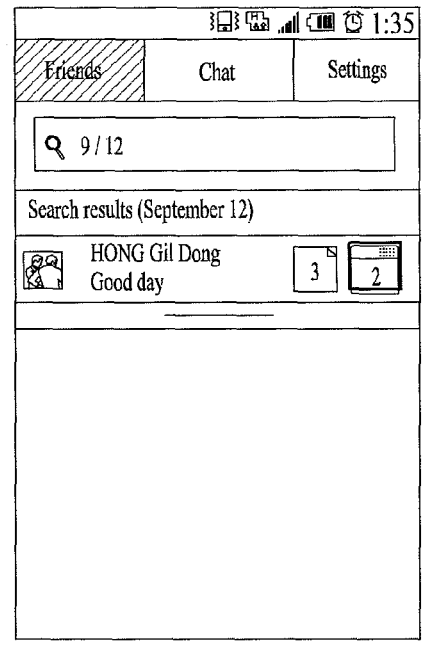
Figure 19:
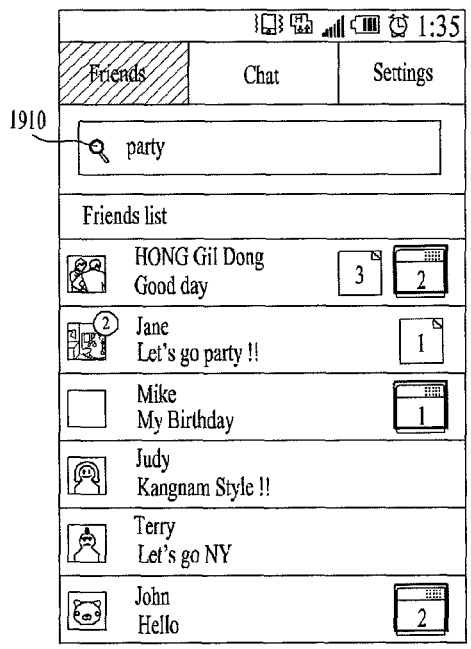
Figure 19:
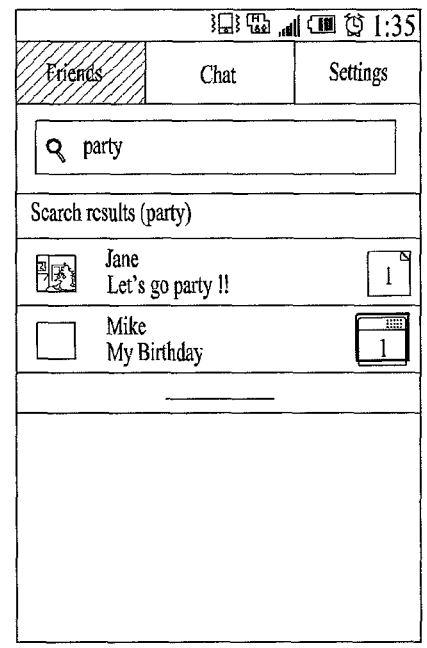

FIG. 19 is a diagram for one example to describe a schedule or memo searching function. Referring to FIG. 19, a user can search for a schedule or memo by inputting a text to a search window 1910 shown in FIG. 19. If a text string of a date type is input to the search window 1910, the controller 180 can extract at least one of a schedule on a date indicated by the input search word and a memo including a text string corresponding to the input search word.

For instance, referring to FIG. 19(*a*), if a user inputs '9/12' to a search window, the controller 180 determines the input search word as 'month/day (or 'day/month') and can then extract and display a counterpart having a schedule planned on September 12 (or December 9). Moreover, the controller 180 may extract a counterpart having a memo including a text string '9/12' input by the user. For instance, the controller 180 can provide the user with such a search result as shown in FIG. 19(*b*).

Meanwhile, FIG. 19(*a*) shows one example that the month and the day are discriminated from each other through a hyphen ('/'), by which the present invention may be non-limited. For another example, if a user input search word includes 4-digit numeral such as '0912', the controller 180 may determine that the first two digits and the last two digits indicate a month (or day) and a day (or month), respectively. If there is a space between numerals such as '9 12', the controller 180 may discriminate a month and a day from each other with reference to the space.

In another instance, referring to FIG. 19(*c*), if a user inputs a text string 'party' to the search window 1910, the controller can extract and display a counterpart having a schedule having an input search word included in a schedule name or a description of the schedule. Moreover, the controller 180 can extract and display a counterpart having a memo including a text string corresponding to the input search word. For instance, the controller 180 can provide the user with such a search result as shown in FIG. 19(*d*).

Referring now to FIG. 4 to describe the present invention, when failing in the data extraction from the first message, the controller 180 determines a type of counterpart information based on the user input (S405) and can then update or add the counterpart information of the type selected by the user (S406). This is to enable at least one portion of the first message to be saved as the counterpart information to be added by the user if it is unable to determine whether to save the first message as the contact data of the chat counterpart, the schedule of the chat counterpart or the memo of the chat counterpart due to the failure in the data extraction from the first message.

When failing in the data extraction from the first message, a process for updating or adding the counterpart information of the user-selected type is described with reference to FIG. 20 as follows.

Figure 20:
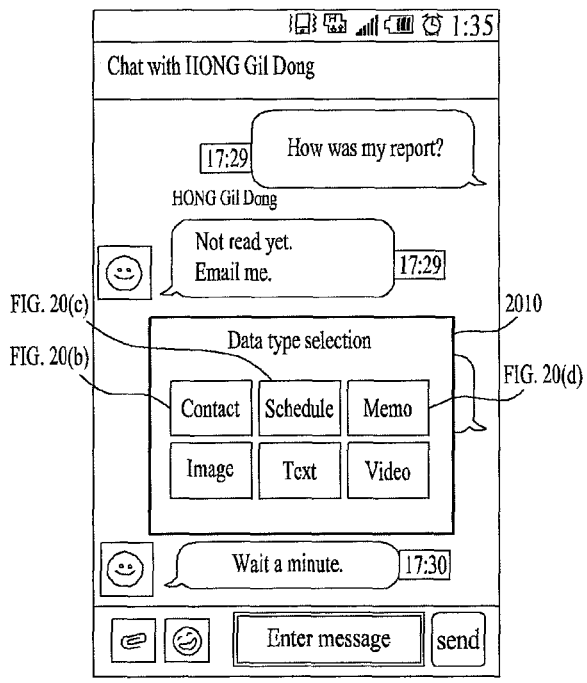
FIGS. 20(a) to 20(d) are diagrams illustrating one example to describe a process for updating or adding counterpart information of a user-selected type when failing in data extraction from a first message.
Figure 20:
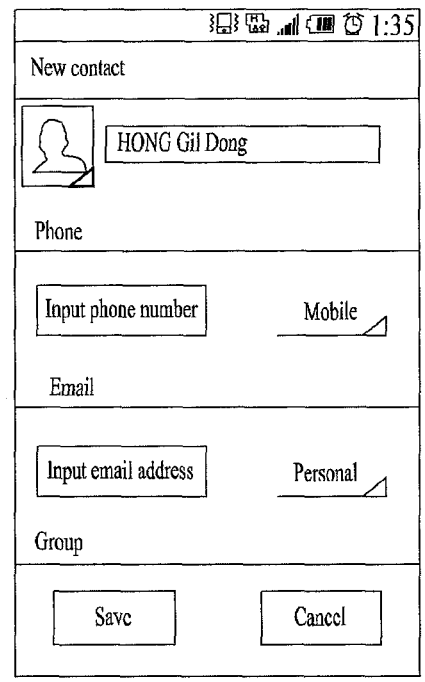
Figure 20:
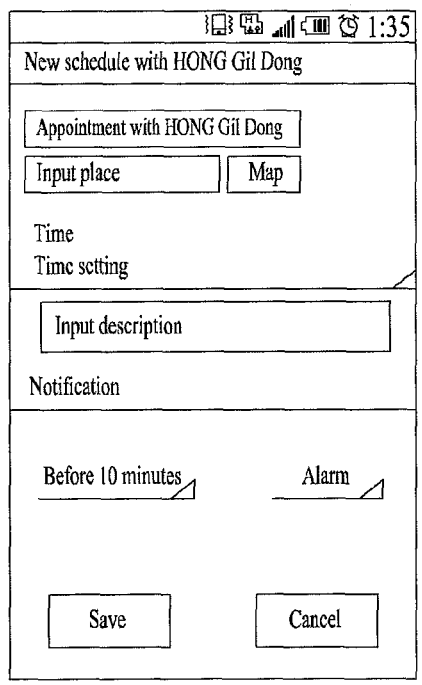
Figure 20:
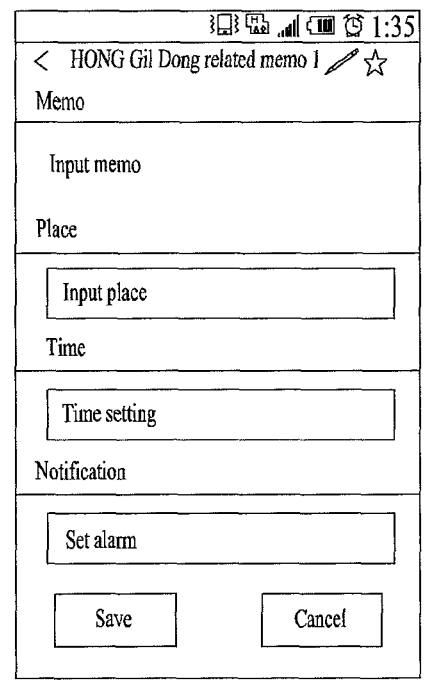

FIG. 20 is a diagram for one example to describe a process for updating or adding counterpart information of a user-selected type when failing in data extraction from a first message. Referring to FIG. 20(*a*), when failing in data extraction from a first message, the controller 180 can control a selection window 2010, which is provided to determine a type of a counterpart information, to be displayed. Based on a user input to the selection window 2010, the controller 180 can control at least one of a contact data of a chat counterpart, a schedule with the chat counterpart and a memo for the chat counterpart to be updated or added automatically or manually.

For instance, in the example shown in FIG. 20(*a*), an item 'phonebook (contact)' may be provided to update or add a contact data of a chat counterpart. In the example shown in FIG. 20(*a*), if the item 'phonebook' is touched, the controller 180 extracts the contact data of the chat counterpart from a phonebook database. Subsequently, referring to FIG. 20(*b*), the controller 180 displays the extracted contact data of the chat counterpart on the touchscreen, thereby enabling a user to update the contact data of the chat counterpart manually. If the contact data of the chat counterpart is not saved in the phonebook database, as mentioned in the foregoing description with reference to FIG. 8, the controller 180 may newly create a contact data of the chat counterpart.

In another instance, in the example shown in FIG. 20 (a), an item 'schedule' is provided to add a schedule with a chat counterpart. If the item 'schedule' is touched in the example shown in FIG. 20(a), referring to FIG. 20(c), the controller 180 can control a screen, which is provided to add a schedule with a chat counterpart, to be displayed. A user inputs a start time of a schedule and information on a place corresponding to an occurrence of the schedule, thereby controlling the schedule with the chat counterpart to be added.

For a further instance, in the example shown in FIG. 20(a), an item 'memo' is provided to add a memo for a chat counterpart. If the item 'memo' is touched in the example shown in FIG. 20(a), referring to FIG. 20(d), the controller 180 can control a screen, which is provided to add a memo for a chat counterpart, to be displayed. A user writes a memo of material to remember the chat counterpart through the screen shown in FIG. 20(d), thereby controlling the memo for the chat counterpart to be added.

According to another embodiment of the present invention, the controller 180 can control at least one of an image included in the first message, a video included in the first message and a text string recorded in the first message to be saved as a file of an image, video or document format.

For instance, in the example shown in FIG. 20(a), the item 'image' displayed on the selection window may be provided to save the image included in the first message as a file of the image format in the memory 160 and the item 'video' displayed on the selection window may be provided to save the video included in the first message as a file of the video format in the memory 160. In this instance, the item 'image'/'video' may be activated in the selection window only if the image/video file is attached to the first message. In the example shown in FIG. 20(a), the item 'document' may be provided to save an image, a text string and the like included in the first message as a file of the document format. In this instance, the file of the document format may mean a file that can be read using a word processor or the like. If the item 'document' is touched in FIG. 20(a), the controller 180 can control a content of at least one of the image and the text string included in the first message to be created as a document file.

According to the description with reference to FIG. 4, when failing in the data extraction from the first message, the type of the counterpart information is determined by the user input and the counterpart information of the user-selected type can be updated or added (S405, S406). According to another embodiment of the present invention, the step S405 of determining the type of the counterpart information based on the user input and the step S406 of updating or adding the counterpart information of the user-selected type may be omitted.

If the steps S405 and S406 are omitted, the controller 180 of the mobile terminal 100 according to one embodiment of the present invention may control a popup window, which indicates the failure in the data extraction from the first message, to be displayed instead of displaying the selection window for displaying a list of counterpart information candidates.

In another instance, when failing in extracting personal information data and time information data from the first message, the controller 180 may control at least one portion of the first message to be added as a memo for a chat counterpart. In particular, without performing the above-mentioned extraction of the memo related keyword, by controlling the first message to be automatically saved as the memo for the chat counterpart, the controller 180 can prevent the occurrence of the failure in updating or adding the counterpart information using the first message.

Although FIG. 4 shows one example that the type of the counterpart information is determined by the user input when the failure in the data extraction from the first message, unlike FIG. 4, the controller 180 may determine a type of a counterpart information by a user input before attempting the data extraction from the first message. If the type of the counterpart information is determined by the user input before attempting the data extraction from the first message, the controller 180 can determine to extract which data from the first message depending on the user-selected type of the counterpart information. This is described in detail with reference to FIG. 21 as follows.

Figure 21:
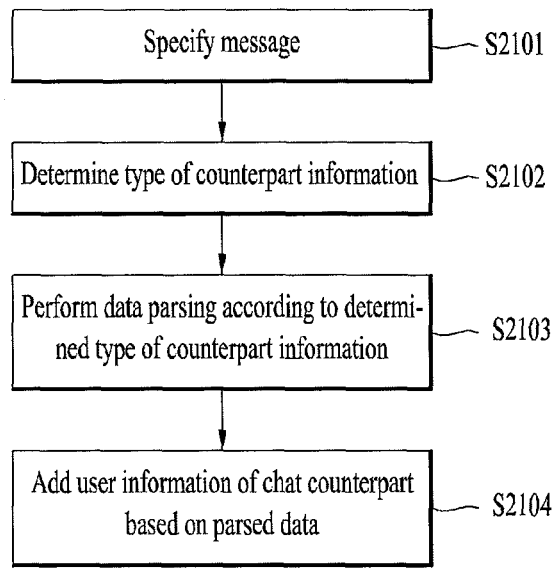
FIG. 21 is a flowchart illustrating an operation of a mobile terminal according to the present invention.

FIG. 21 is a flowchart for an operation of a mobile terminal according to the present invention. Since a step S2101 shown in FIG. 21 corresponds to the former step S401 shown in FIG. 4, its details shall be omitted from the following description.

Regarding the steps that follow the step S2101, if a first message is specified, the controller 180 can determine a type of a counterpart information in response to a user input (S2102). In this instance, the type selectable in response to the user input may include one of a contact data of a chat counterpart, a schedule with the chat counterpart and a memo for the chat counterpart. The selection of the type in response to the user input can refer to the former description with reference to FIG. 20 and its details shall be omitted from the following description.

If the type of the counterpart information is selected, the controller 180 attempts a data extraction by targeting a first message in accordance with the selected type of the counterpart information (S2103) and can then control the counterpart information of the chat counterpart to be updated or added based on the data extracted as a result of the data extraction (S2104).

If the contact data of the chat counterpart is selected as the counterpart information, the controller 180 can attempt the extraction of personal information data from the first message. If the personal information data is extracted from the first message, the controller 180 can update the contact data of the chat counterpart based on the extracted person information data. For instance, when an email address 'abc@abc.com' of the chat counterpart is extracted from the first message, the controller 180 can update the contact data of the chat counterpart by inserting the extracted personal information data in an email address field value of the contact data of the chat counterpart. If it is unable to extract the contact data of the chat counterpart from the phonebook database, as mentioned in the foregoing description with reference to FIG. 8, it may be able to add the contact data of the chat counterpart.

When failing in the extraction of the personal information data from the first message, as shown in FIG. 20(b), the screen for adding the contact data of the chat counterpart may be output. If the schedule with the chat counterpart is selected as the counterpart information, the controller 180 may attempt an extraction of time information data from the first message.

If the time information data is extracted from the first message, the controller 180 can add the schedule with the chat counterpart to the day and time indicated by the extracted time information data. For instance, if the time information data '3 o'clock on Sunday, this week' is selected from the first message, the controller 180 can control the schedule with the chat counterpart to be added to 3 PM (or AM) on the date corresponding to 'Sunday, this week'.

When failing in the extraction of the time information data from the first message, as shown in FIG. 20(c), the screen for adding the schedule with the chat counterpart may be output. If the memo for the chat counterpart is selected as the counterpart information, the controller 180 may control a memo, which includes at least one portion of the first message as a content, to be added.

For instance, when the memo, as mentioned in the foregoing description with reference to FIG. 12, only if the memo related keyword is extracted from the first message, at least one portion of the first message may be used as the memo content. Alternatively, it is able to control the at least one portion of the first message to be inserted as the memo content without the extraction of the memo related keyword.

As mentioned in the description of the foregoing example, the controller 180 determines the counterpart information type in response to the user input and can then determine data to extract in accordance with the determined counterpart information type.

It may be unnecessary to implement the embodiments described with reference to FIG. 4 and FIG. 21 separately. In some cases, the embodiments shown in FIG. 4 and FIG. 21 can be integrated into one embodiment. For instance, by taking an automatic extraction option, if the automatic extraction option is activated, the embodiment shown in FIG. 4 can be followed. If the automatic extraction option is deactivated, the embodiment shown in FIG. 21 can be followed.

According to the embodiments shown in FIG. 4 and FIG. 21, it is able to add counterpart information based on data extracted from one of messages with a chant counterpart. However, a target of the data extraction may be non-limited by one of the messages transceived with a prescribed counterpart. According to another example of the present invention, the mobile terminal 100 according to the present invention can designate information displayed through a webpage, a document or the like as a target of the data extraction. For instance, while a prescribed webpage is output through a web browser, if at least one of a text string and image recorded on the webpage is selected, the controller 180 performs data extraction by targeting a user-selected information and can then control counterpart information to be added based on the extracted data. However, when displaying a webpage, a document or the like, unlike the case of displaying messages transceived with a chat counterpart, it is unable to specify a chat counterpart linkable to counterpart information at a time. Hence, a process for specifying a prescribed counterpart linkable to counterpart information by a user input may be necessary. This is described in detail with reference to FIG. 22 as follows.

Figure 22:
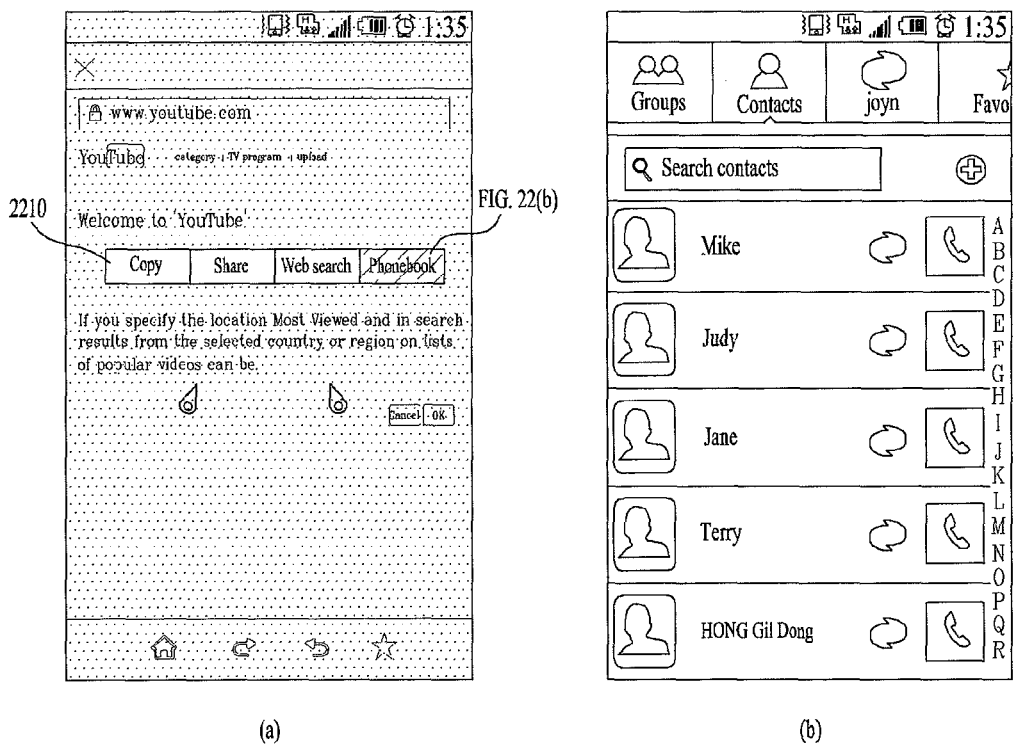
FIGS. 22(a) and 22(b) are diagrams illustrating one example to describe a process for adding data extracted from information displayed on a webpage as counterpart information of a prescribed counterpart.

FIG. 22 is a diagram for one example to describe a process for adding data extracted from information displayed on a webpage as counterpart information of a prescribed counterpart. Referring to FIG. 22, while a prescribed webpage is displayed through the touchscreen, if at least one portion of information recorded on the webpage is selected, the controller 180 can control a popup window 2210, on which a list of operations executable based on the selected information is displayed, to be displayed (FIG. 22(*a*)). Since the items 'copy', 'share', 'web search' and the like are already known to the public, details of the items shall be omitted.

If the item 'phonebook' is selected in the example shown in FIG. 22(*a*), the controller 180 can control a counterpart list saved in a phonebook database to be displayed (FIG. 22(*b*)). If a prescribed counterpart is selected in the example shown in FIG. 22(*b*), the controller 180 extracts the selected information and can then add the counterpart information of the selected counterpart based on the extracted information. If personal information data is extracted from the selected information, contact data of the selected prescribed counterpart can be updated. If time information data is extracted from the selected information, schedule information with the selected prescribed counterpart can be added. Otherwise, if a memo related keyword is selected from the selected information or the extraction of the personal information data and the time information data from the selected information is not successful, a memo for the selected prescribed counterpart can be added.

However, it may be unnecessary for the data extraction to be performed on the selected information. The controller 180 of the mobile terminal 100 according to another embodiment of the present invention can control the selected information to be directly saved as a field value (e.g., a field in which description of the prescribed counterpart is written) of contact data of the selected prescribed counterpart or a memo for the selected prescribed counterpart.

Accordingly, embodiments of the present invention provide several advantages. First of all, the present invention can provide a mobile terminal and controlling method thereof, by which user's convenience can be enhanced.

In particular, embodiments of the present invention can provide a mobile terminal and controlling method thereof, by which counterpart information of a chat counterpart can be updated or added based on a message with the chat counterpart. Moreover, embodiments of the present invention can provide a mobile terminal and controlling method thereof, by which counterpart information of a chat counterpart can be updated or added in a manner of automatically extracting prescribed data from a message with the chat counterpart.

It will be appreciated by those skilled in the art that the present invention can be specified into other form(s) without departing from the spirit or scope of the inventions.

In addition, the above-described methods can be implemented in a program recorded medium as process-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a memory configured to store data;
   a wireless communication unit configured to perform wireless communication with a counterpart terminal;
   a display unit configured to display messages communicated with a counterpart of the counterpart terminal; and
   a controller configured to:
      receive a selection signal selecting a first message included in the displayed messages,
      extract data including at least one of counterpart contact information, time information and memo information from the selected first message in response to the received selection signal, and
      update or add information stored in the memory of the mobile terminal using the extracted data,
      wherein the display unit simultaneously displays the first message in a message display region and a profile of the counterpart in a profile display unit, and wherein, when a first point within the message display region and a second point within the profile display region are selected together, the information of the counterpart displayed in the profile display region is updated or added from the first message displayed in the message display region.

2. The mobile terminal of claim 1, wherein when the selection signal corresponds to a touch selection of the first message, the controller is further configured to first output an option for requesting extraction of the data, and to update or add the information in the memory for the counterpart corresponding to the first message when the output option is selected.

3. The mobile terminal of claim 2, wherein when the displayed messages are from at least first and second counterparts, the output option includes options for selecting one of the first and second counterparts, and the controller is further configured to update or add the information in the memory for the selected counterpart.

4. The mobile terminal of claim 2, wherein when the selection signal corresponds to a touch and drag from the first message to a counterpart indicator, the controller is further configured to automatically update or add the information in the memory for the counterpart corresponding to the counterpart indicator without first outputting the option for requesting extraction of the data.

5. The mobile terminal of claim 1, wherein when the extracted data corresponds to the counterpart contact information, the controller is further configured to update or add contact information of the counterpart and stored in the memory of the mobile terminal using the extracted data.

6. The mobile terminal of claim 5, wherein the counterpart contact information includes one of an email address and a phone number of the counterpart.

7. The mobile terminal of claim 1, wherein when the extracted data corresponds to the time information, the controller is further configured to update or add scheduling information for the counterpart and stored in the memory of the mobile terminal using the extracted data.

8. The mobile terminal of claim 7, wherein the scheduling information includes at least one of a time, a date and a place of a schedule for the counterpart of the first message.

9. The mobile terminal of claim 1, wherein when the extracted data corresponds to the memo information, the controller is further configured to update or add memo information of the counterpart and stored in the memory of the mobile terminal using the extracted data.

10. The mobile terminal of claim 9, wherein the memo information includes a memo keyword previously stored in the memory of the mobile terminal, and
wherein the memo keyword indicates to the controller that the extracted data relates to a memo storing function.

11. The mobile terminal of claim 1, wherein the extracted data includes at least one of a text string of an email format, a text string of a phone number format and a multimedia file of an image format as the counterpart information.

12. The mobile terminal of claim 1, wherein the controller is further configured to display a list of contacts included in a phonebook stored in the memory and to display at least one of a first indication indicating a number of schedules updated or added for a corresponding contact and a second indication indicating a number of memos updated or added for the corresponding contact.

13. The mobile terminal of claim 12, wherein the first indication indicates a schedule that is first arriving among the number of schedules updated or added.

14. A method of controlling a mobile terminal, the method comprising:
displaying, via a display unit of the mobile terminal, messages communicated with a counterpart of a counterpart terminal;
receiving, via a controller of the mobile terminal, a selection signal selecting a first message included in the displayed messages;
extracting, via the controller, data including at least one of counterpart contact information, time information and memo information from the selected first message in response to the received selection signal;
updating or adding, via the controller, information stored in the memory of the mobile terminal using the extracted data; and
simultaneously displaying via the display unit, the first message in a message display region and a profile of the counterpart in a profile display unit,
wherein, when a first point within the message display region and a second point within the profile display region are selected together, the information of the counterpart displayed in the profile display region is updated or added from the first message displayed in the message display region.

15. The method of claim 14, wherein when the selection signal corresponds to a touch selection of the first message, the method further comprises first outputting an option for requesting extraction of the data, and updating or adding the information in the memory for the counterpart corresponding to the first message when the output option is selected.

16. The method of claim 15, wherein when the displayed messages are from at least first and second counterparts, the output option includes options for selecting one of the first and second counterparts, and the method further comprises updating or adding the information in the memory for the selected counterpart.

17. The method of claim 15, wherein when the selection signal corresponds to a touch and drag from the first message to a counterpart indicator, the method further comprises automatically updating or adding the information in the memory for the counterpart corresponding to the counterpart indicator without first outputting the option for requesting extraction of the data.

18. The method of claim 14, wherein when the extracted data corresponds to the counterpart information, the method further comprises updating or adding contact information of the counterpart and stored in the memory of the mobile terminal using the extracted data.

* * * * *